United States Patent [19]
Yoshida

[11] Patent Number: 6,141,109
[45] Date of Patent: *Oct. 31, 2000

[54] DATA COMMUNICATION APPARATUS AND METHOD INCLUDING CONTROL OF SORTER TO CHANGE PRINT DISCHARGE BIN ACCORDING TO RECEIVED ADDRESS SIGNAL OR NUMBER OF PAGES

[75] Inventor: Takehiro Yoshida, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,596

[22] Filed: Apr. 1, 1997

Related U.S. Application Data

[62] Division of application No. 08/230,709, Apr. 21, 1994, Pat. No. 5,640,250.

[30] Foreign Application Priority Data

| Apr. 22, 1993 | [JP] | Japan | 5-095989 |
| Apr. 22, 1993 | [JP] | Japan | 5-095993 |

[51] Int. Cl.⁷ .............. G06K 15/16; H04N 1/23; H04N 1/32
[52] U.S. Cl. .............. 358/1.12; 358/402; 358/440; 358/468; 358/296
[58] Field of Search .............. 358/402, 444, 358/440, 468, 434, 438, 435, 403, 436; 379/100.08, 100.09, 93.24, 100.07; 399/405; 271/298

[56] References Cited

U.S. PATENT DOCUMENTS

| 4,522,486 | 6/1985 | Clark et al. ............... 399/403 |
| 5,189,525 | 2/1993 | Kotani ....................... 358/407 |
| 5,216,517 | 6/1993 | Kinoshita et al. ............ 358/440 |
| 5,295,181 | 3/1994 | Kuo ........................... 379/100.07 |
| 5,328,169 | 7/1994 | Mandel ...................... 271/298 |
| 5,358,238 | 10/1994 | Mandel et al. ............. 271/298 |
| 5,513,013 | 4/1996 | Kuo ........................... 379/100.07 |
| 5,521,719 | 5/1996 | Yamada ...................... 358/440 |
| 5,535,012 | 7/1996 | Matsumoto et al. ......... 358/468 |
| 5,551,686 | 9/1996 | Sanchez et al. ............ 271/298 |
| 5,557,425 | 9/1996 | Hasegawa ................... 358/440 |
| 5,580,045 | 12/1996 | Matsumoto et al. ......... 271/298 |
| 6,041,214 | 3/2000 | Fujikura et al. ............ 399/405 |

FOREIGN PATENT DOCUMENTS

| 2113768 | 4/1990 | Japan ................. H04N 1/32 |
| 7-097125 | 4/1995 | Japan ................. H04N 1/00 |
| 8-026587 | 1/1996 | Japan ................. B65H 29/60 |
| 10-291726 | 11/1998 | Japan ................. B65H 43/06 |

*Primary Examiner*—Scott A. Rogers
*Attorney, Agent, or Firm*—Fitzpatrick, Cella, Harper & Scinto

[57] ABSTRACT

A facsimile apparatus includes a reception unit for receiving image data and a procedure signal, a detection unit for detecting a sub-address from the procedure signal received by the reception unit, a recording unit for recording the image data received by the reception unit, a sorter having a plurality of bins for sorting record sheets on which image data are recorded by the recording unit, and a control unit for controlling the sorter to sort the record sheets, on which the image data are recorded by the recording unit, in accordance with sub-addresses detected by the detection unit.

10 Claims, 17 Drawing Sheets

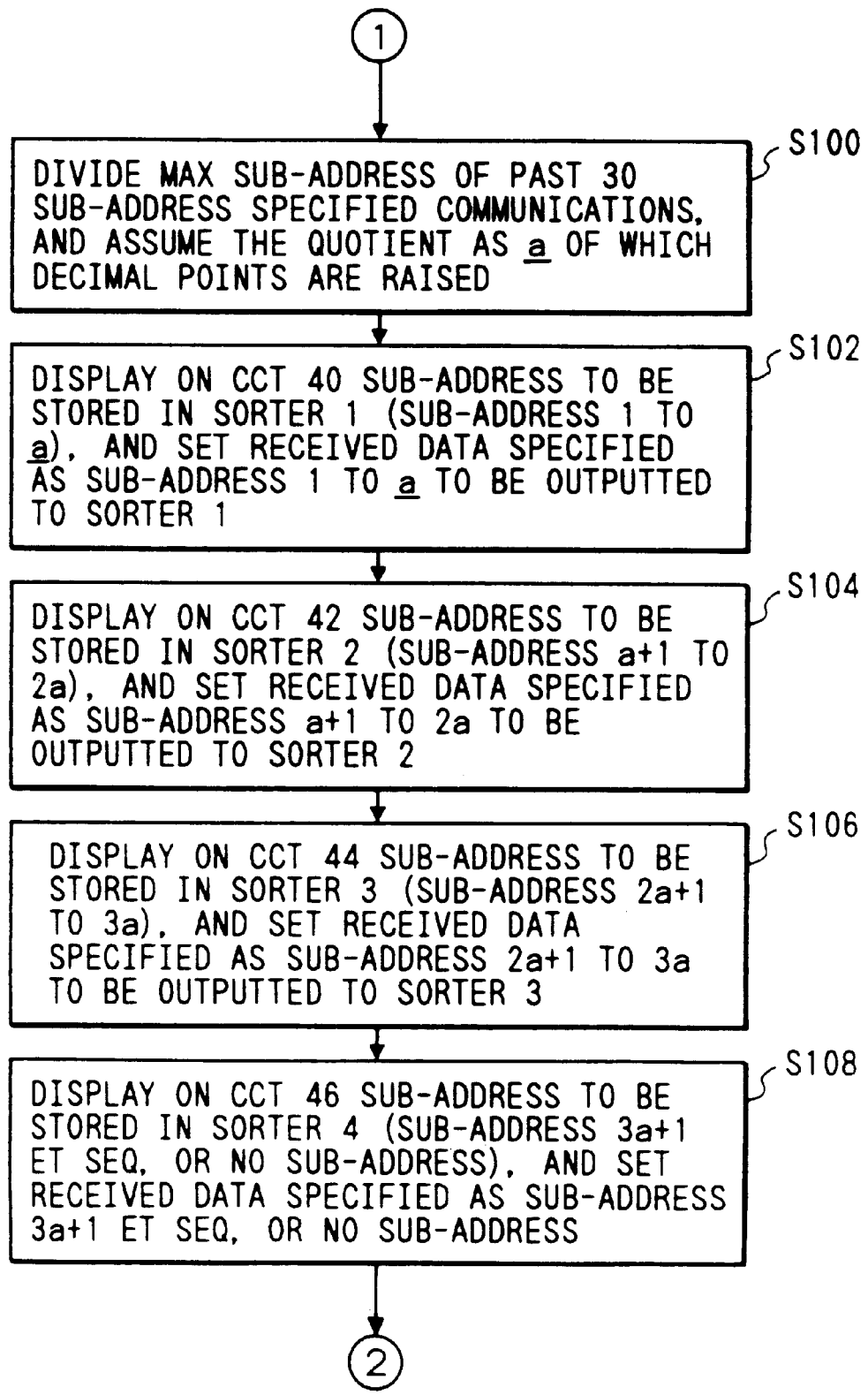

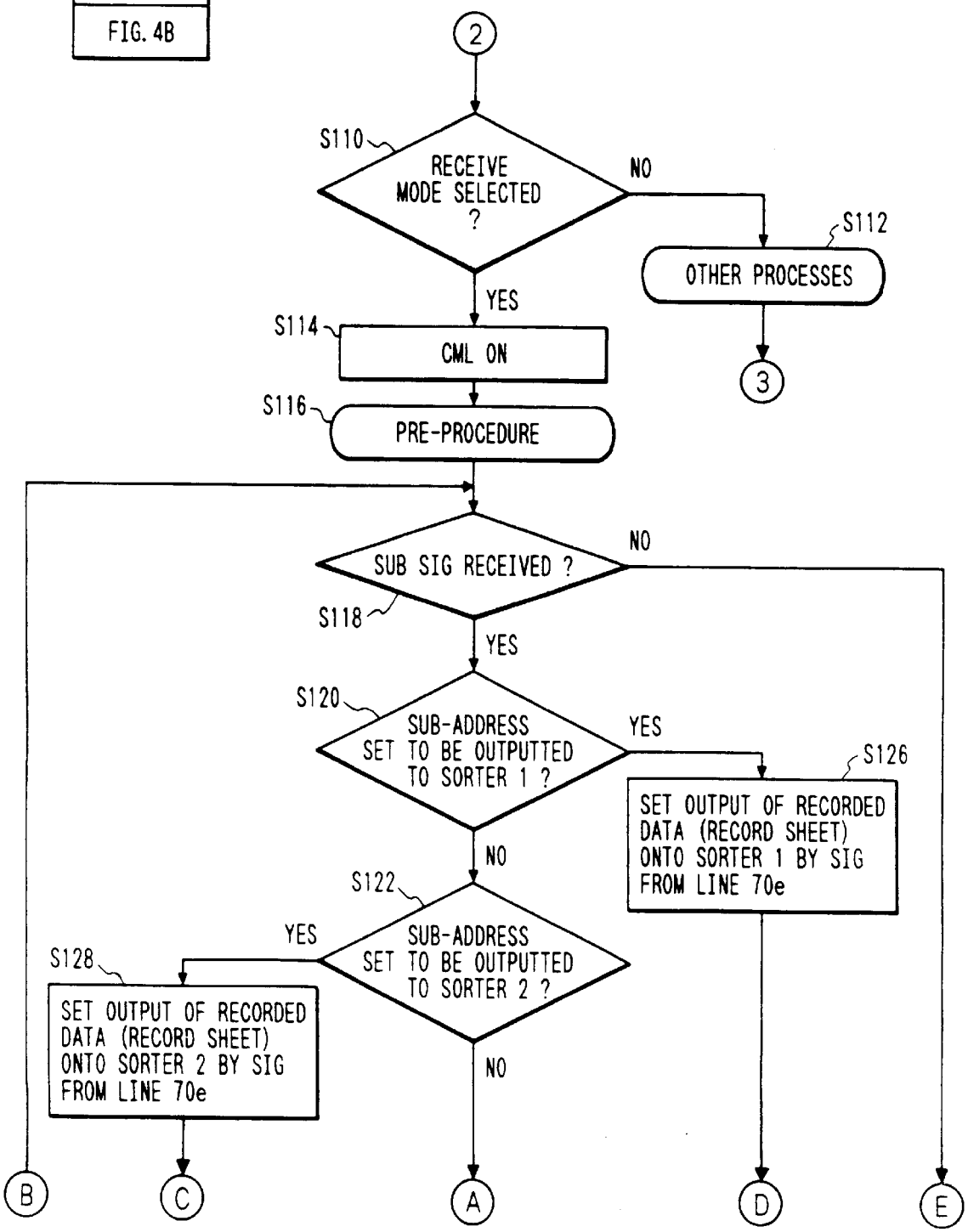

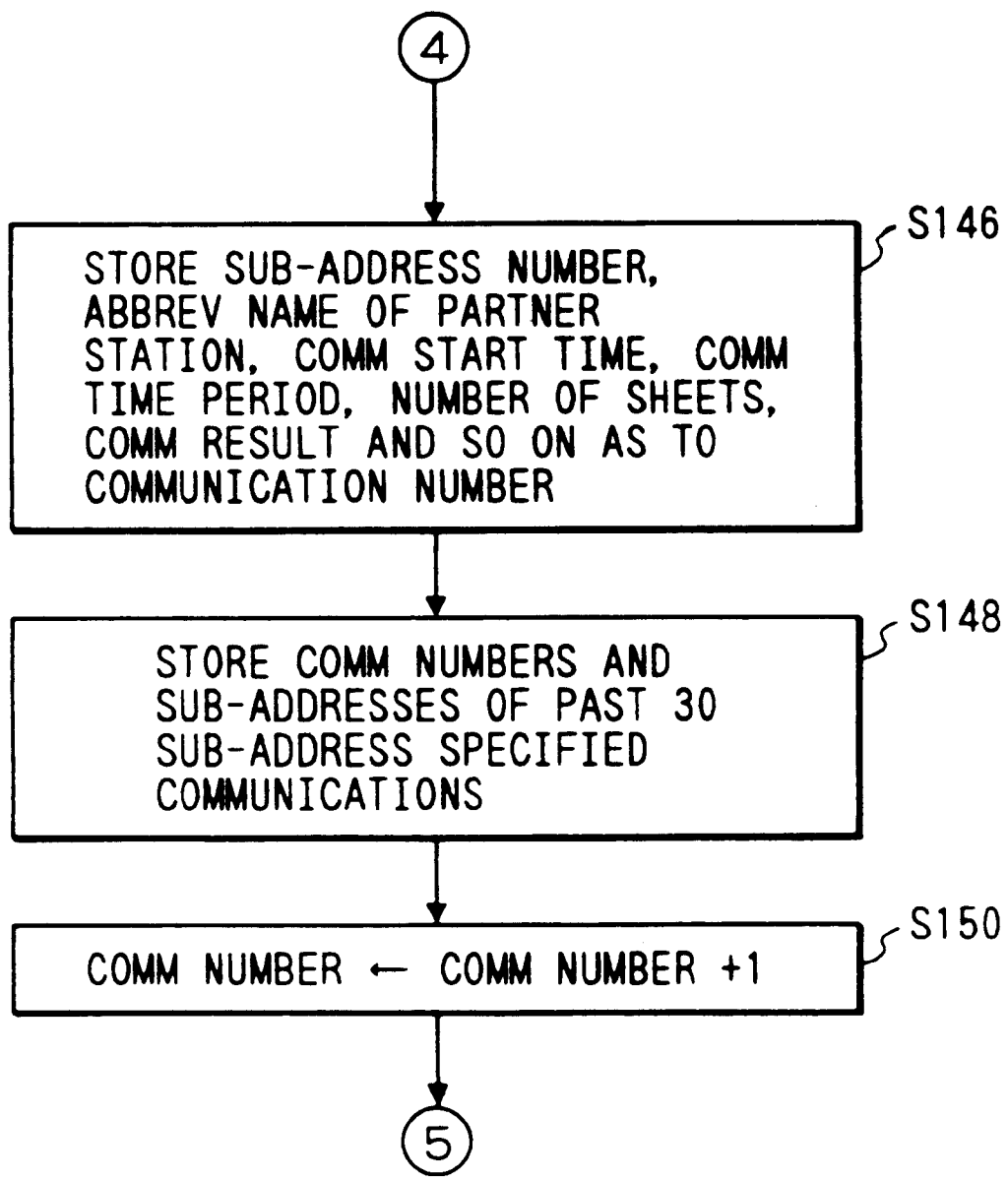

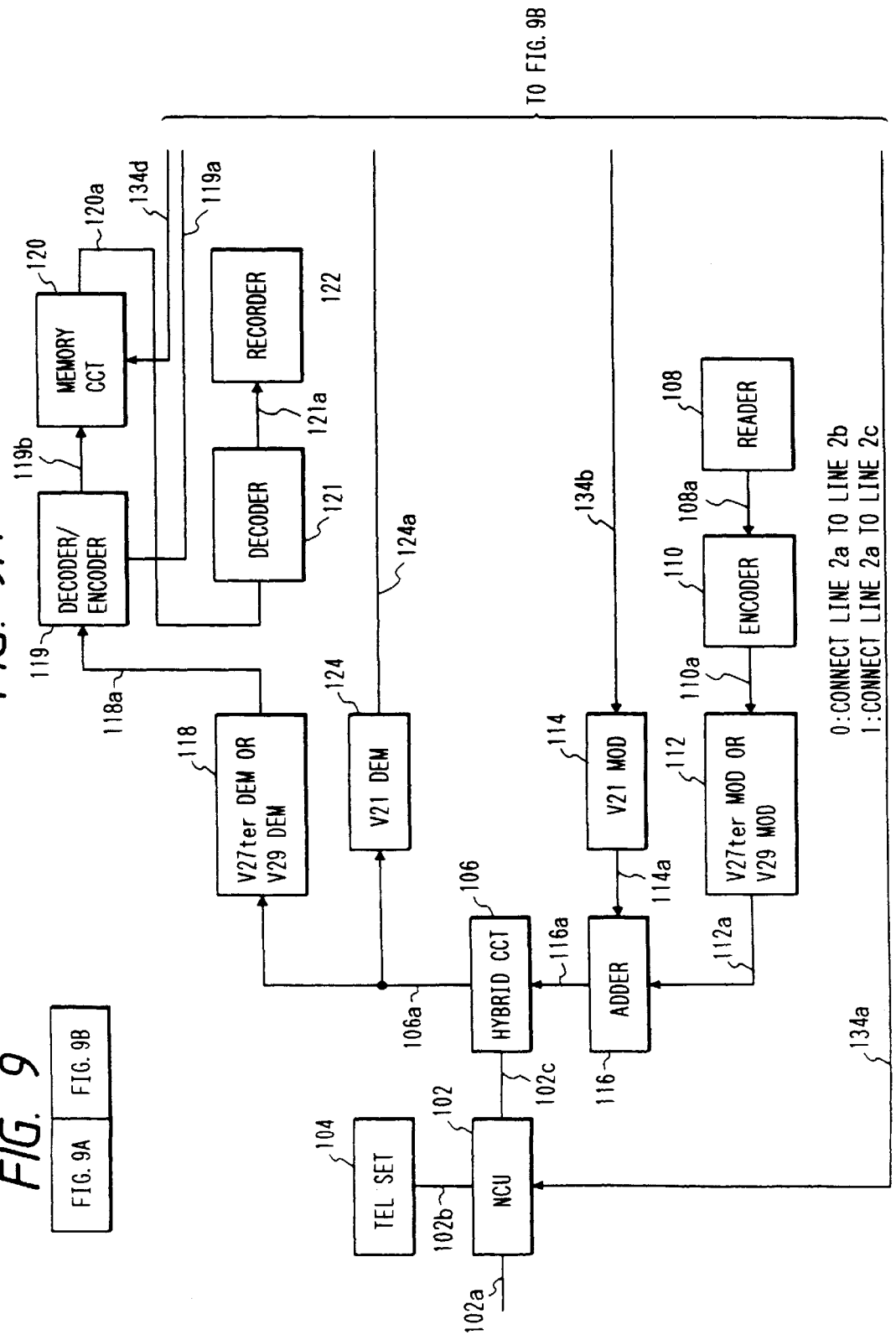

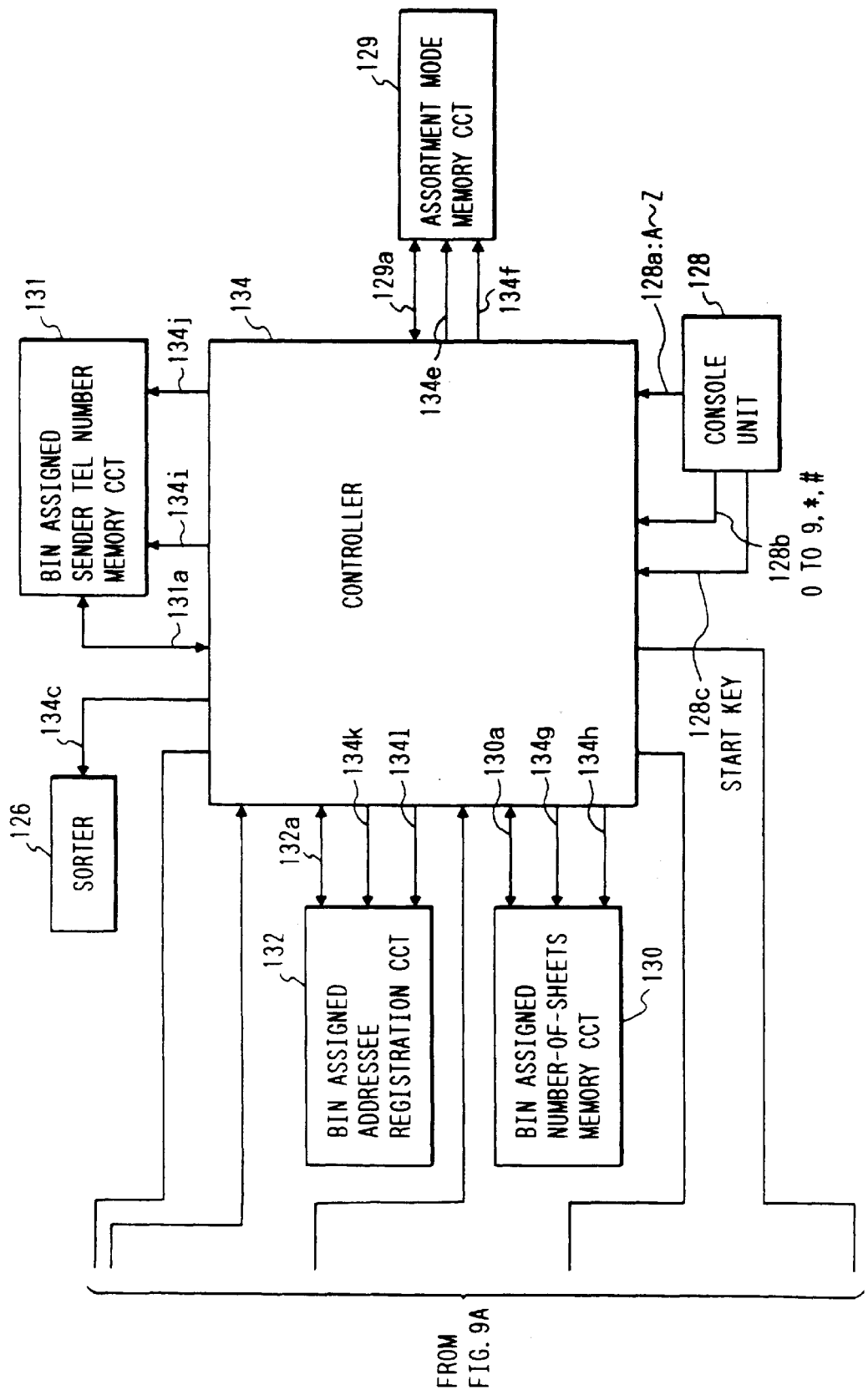

6,141,109

DATA COMMUNICATION APPARATUS AND METHOD INCLUDING CONTROL OF SORTER TO CHANGE PRINT DISCHARGE BIN ACCORDING TO RECEIVED ADDRESS SIGNAL OR NUMBER OF PAGES

This application is a division of application Ser. No. 08/230,709 filed Apr. 21, 1994, now U.S. Pat. No. 5,640,250.

BACKGROUND OF THE INVENTION

1. Field of the Invention

The present invention relates to a facsimile apparatus and, more particularly, to a facsimile apparatus which can perform sub-address specified communications.

In addition, the present invention relates to a facsimile apparatus and, more particularly, to a facsimile apparatus with a sorter having a plurality of bins.

2. Related Background Art

No facsimile apparatus capable of performing sub-address specified communications has been proposed.

For this reason, although a sender can generate an outgoing call to a partner station to transmit data thereto, a specific addressee at the receiver end cannot be specified.

Recently, various new G3 functions have been under discussion in CCITT SG8, and the discussion includes the standardization of sub-address specified communications. It seems that a recommendation of this standardization will be made before the end of the year.

In addition, with regard to a facsimile apparatus with a sorter having a plurality of bins, some consideration has been given to the bins of a sorter, which is designed to sort data in units of communications, in order to facilitate the distribution of received data.

In general, a sorter has about 10 or 20 bins. If the frequency of occurrence of reception is high, the sorter becomes full soon after a sorting operation is started. Especially, a normal document often includes about one to three record sheets. If, therefore, these sheets are sorted in units of communications, it cannot be said that the sorter is effectively used.

SUMMARY OF THE INVENTION

It is an object of the present invention to improve a facsimile apparatus.

It is another object of the present invention to provide a facsimile apparatus which includes a sorter having a plurality of bins, and a means for identifying the number of received sheets, can change bins to which received data are outputted, in accordance with the number of received sheets, and can output data of the same number of received sheets to the same bin.

It is still another object of the present invention to provide a facsimile apparatus which includes a means for identifying the number of received sheets, can change some bins, of all the bins of a sorter, to which received data are outputted, in accordance with the number of received sheets, and can change the remaining bins to which received data are outputted, for each communication end.

It is still another object of the present invention to provide a facsimile apparatus which includes a means for identifying the number of received sheets, can change some bins, of all the bins of a sorter, to which received data are outputted, in accordance with the number of received sheets, and can change the remaining bins to which received data are outputted, for each sender.

It is still another object of the present invention to provide a facsimile apparatus which includes a means for identifying the number of received sheets, can change some bins, of all the bins of a sorter, to which received data are outputted, in accordance with the number of received sheets, and can change the remaining bins to which received data are outputted, for each addressee.

It is still another object of the present invention to provide an application for a facsimile apparatus for performing sub-address specified communications.

It is still another object of the present invention to provide a facsimile apparatus capable of performing sub-address specified communications, which can change the positions of sorters to which received data are outputted, in accordance with sub-addresses specified by senders.

BRIEF DESCRIPTION OF THE DRAWINGS

FIG. 3 is a flow chart showing the control sequence of the control circuit 70 in FIGS. 1A and 1B;

FIG. 5 is a flow chart showing the control sequence of the control circuit 70 in FIGS. 1A and 1B;

FIG. 9 is comprised of FIGS. 9A and 9B showing block diagrams of a facsimile apparatus according to the seventh to twelfth embodiments of the present invention;

DETAILED DESCRIPTION OF THE PREFERRED EMBODIMENTS (First Embodiment)

An embodiment of the present invention will be described in detail below with reference to the accompanying drawings.

Figures 1, 1A:
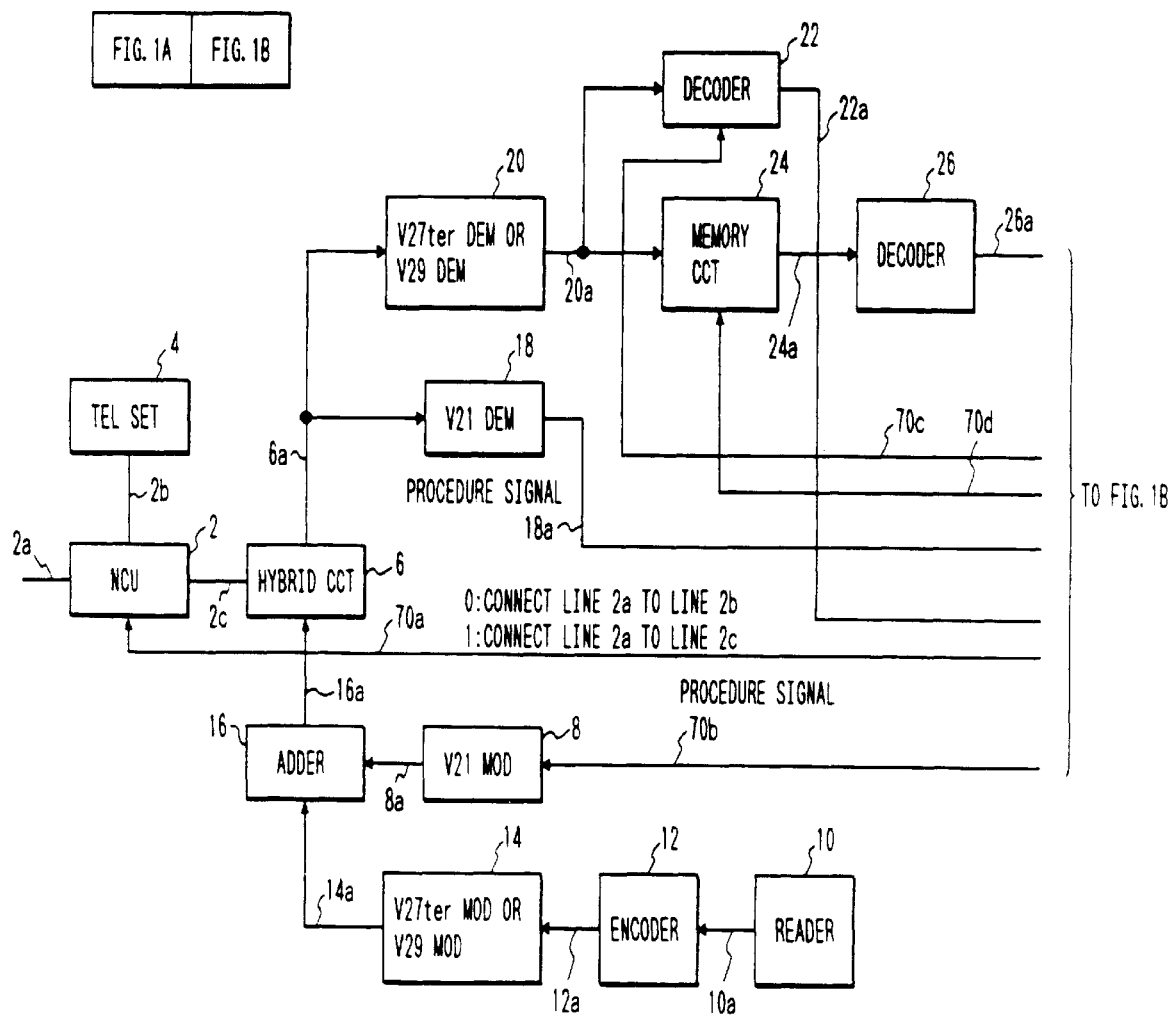
FIG. 1 is comprised of FIGS. 1A and 1B showing block diagrams of a facsimile apparatus according to the first to sixth embodiments of the present invention.
Figure 1B:
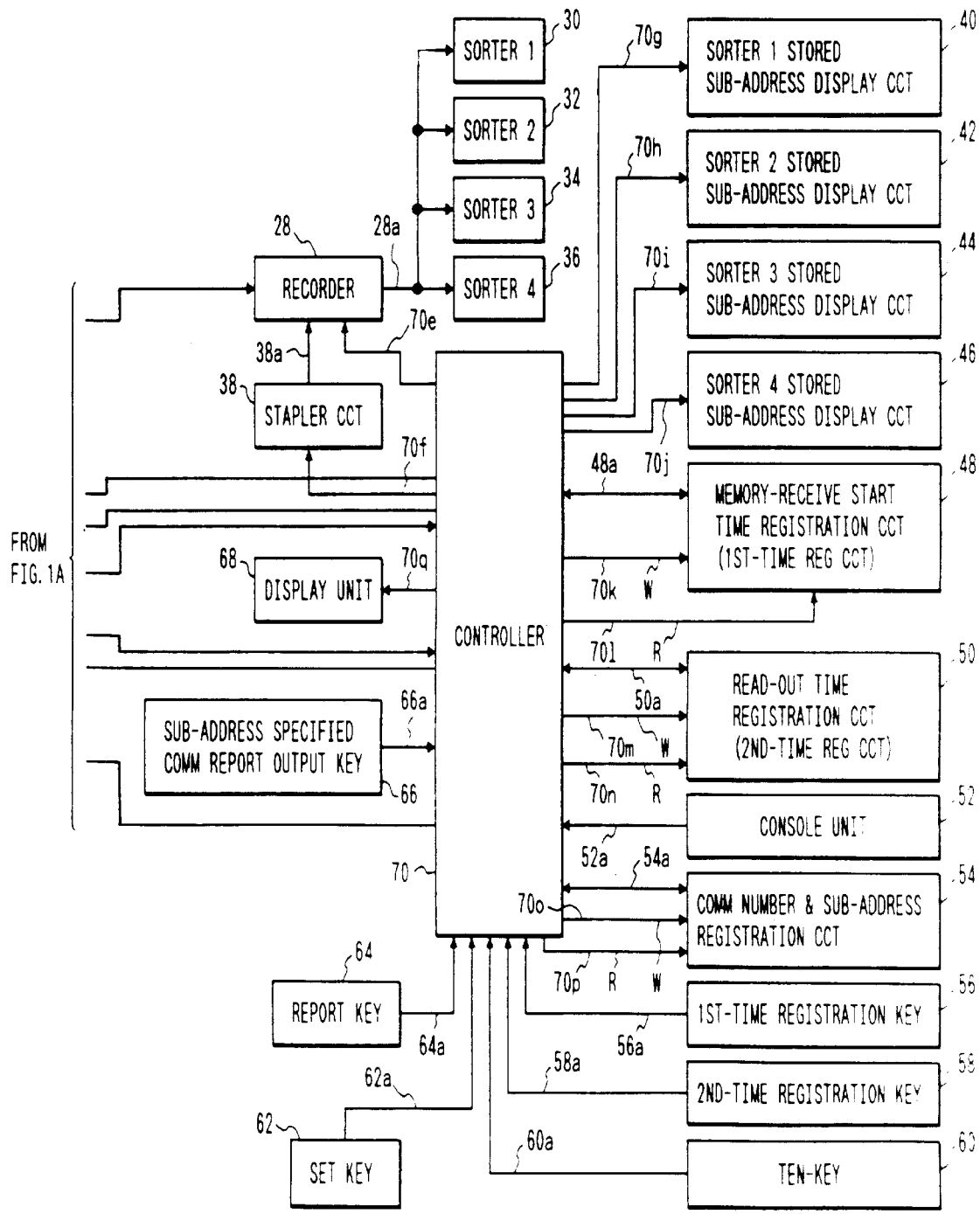

FIGS. 1A and 1B are block diagrams showing a facsimile apparatus according to an embodiment of the present invention.

Referring to FIGS. 1A and 1B, an NCU (Network Control Unit) 2 connects a telephone network to terminals connected to the lines of the NCU 2 to use the telephone network for data communication and the like. That is, the NCU 2 performs connection control with respect to a telephone switched network, switches to a data communication path, and holds a loop. A signal line 2a is a telephone line. The NCU 2 receives a signal on a signal line 70a, and connects the telephone line to the telephone set side, i.e., connects the signal line 2a to a signal line 2b, when the signal level is "0". When the signal level is "1", the NCU 2 connects the telephone line to the facsimile apparatus side, i.e., connects the signal line 2a to a signal line 2c. In a normal state, the telephone line is connected to the telephone set side.

The apparatus includes a telephone set 4.

A hybrid circuit 6 serves to separate signals into signals for the transmission system and signals for the reception system. More specifically, a transmission signal on a signal line 16a is sent to the telephone line via the signal line 2c and the NCU 2. A signal sent from a partner station is outputted to a signal line 6a via the NCU 2 and the signal line 2c.

A modulator 8 performs modulation on the basis of the known CCITT recommendation v21. The modulator 8 receives a procedure signal on a signal line 70b, modulates it, and outputs the modulated data to a signal line 8a.

A reader 10 sequentially reads a one-line image signal from a transmission original in the main scanning direction, and forms a signal string (constituted by binary values representing "white" and "black". The reader 10 is constituted by an image pickup device, e.g., a CCD (charge-coupled device), and an optical system. The signal string as binary values representing "white" and "black" is outputted to a signal line 10a.

An encoder 12 receives read data outputted to the signal line 10a, and outputs coded (MH (modified Huffman) coding or MR (modified Read) coding) data to a signal line 12a.

A modulator 14 performs modulation on the basis of the known CCITT recommendation v27ter (differential phase modulation) or CCITT recommendation v29 (quadrature modulation). The modulator 14 receives the signal on the signal line 12a, modulates it, and outputs the modulated data to a signal line 14a.

An adder 16 receives the signals on the signal lines 8a and 14a, and outputs the sum to the signal line 16a.

A demodulator 18 performs demodulation on the basis of the known CCITT recommendation v21. The demodulator 18 receives the signal on the signal line 6a, demodulates it on the basis of the CCITT recommendation v21, and outputs the demodulated data to a signal line 18a.

A demodulator 20 performs demodulation on the Basis of the known CCITT recommendation v27ter (differential phase modulation) or CCITT recommendation v29 (quadrature modulation). The demodulator 20 receives the signal on the signal line 6a, demodulates it, and outputs the demodulated data to a signal line 20a.

A decoder 22 receives the signal outputted to the signal line 20a, decodes the signal (MH (modified Huffman) decoding or MR (modified Read) decoding), and outputs data representing the error state of the received image to a signal line 22a. The decoder 22 determines the error state of the received image after a clear pulse is supplied to a signal line 70c. Upon determining that the reception state is good, the decoder 22 outputs a "0"-level signal to the signal line 22a. Upon determining that the reception state is bad, the decoder 22 outputs a "1"-level signal to the signal line 22a.

A memory circuit 24 stores the demodulated data outputted to the signal line 20a in accordance with (control through a signal line 70d. In addition, the memory circuit 24 outputs the data stored therein to a signal line 24a in accordance with control through the signal line 70d.

A decoder 26 receives the signal outputted to the signal line 24a, and outputs the decoded signal (MH (modified Huffman) decoding or MR (modified Read) decoding) to a signal line 26a.

A recorder 28 receives the data outputted to the signal line 26a and sequentially records the data line by line. In accordance with control through a signal line 70e, the recorder 28 serves to bind recorded data with a stapler or designate one of sorters 1 to 4 to which the recorded data is to be outputted.

A sorter 1 (30) stores the recorded data when the recorded data is to be outputted to the sorter 1 upon designation through the signal line 70e.

A sorter 2 (32) stores the recorded data when the recorded data is to be outputted to the sorter 2 upon designation through the signal line 70e.

A sorter 3 (34) stores the recorded data when the recorded data is to be outputted to the sorter 3 upon designation through the signal line 70e.

A sorter 4 (36) stores the recorded data when the recorded data is to be outputted to the sorter 4 upon designation through the signal line 70e.

A stapler circuit 38 staples recorded data through a signal line 38a when a bind pulse is supplied to a signal line 70f.

A sorter 1 stored sub-address display circuit 40 receives sub-address data outputted to a signal line 70g, and displays it as a sub-address stored in the sorter 1.

A sorter 2 stored sub-address display circuit 42 receives sub-address data outputted to a signal line 70h, and displays it as a sub-address stored in the sorter 2.

A sorter 3 stored sub-address display circuit 44 receives sub-address data outputted to a signal line 70i, and displays it as a sub-address stored in the sorter 3.

A sorter 4 stored sub-address display circuit 46 receives sub-address data outputted to a signal line 70j, and displays it as a sub-address stored in the sorter 4.

A memory-receive start time registration circuit (1st-time registration circuit) 48 serves to register the time at which a mode for storing received data in a memory is started. When the time at which the mode for storing received data in the memory is started is to be registered in the circuit 48, a write pulse is supplied to a signal line 70k after data indicating a specific hour and minute (e.g., 22:00) is outputted to a signal line 48a. With this operation, the time is registered in the circuit 48. When the time at which the mode for storing received data in the memory is started is to be read out from the circuit 48, a read pulse is supplied to a signal line 701. With this operation, the data indicating the-time (e.g., 22:00), stored in the circuit 48, at which the mode for storing received data in the memory is started is outputted to the signal line 48a.

A read-out time registration circuit (2nd-time registration circuit) 50 serves to register the time at which a mode for outputting received data from the memory is set. When the time at which the mode for outputting received data from the memory is set is to be registered in the circuit 50, a write pulse is supplied to a signal line 70m after data indicating a specific hour and minute (e.g., 8:00) is outputted to a signal line 50a. With this operation, the time is registered in the circuit 50. When the time at which the mode for outputting received data from the memory is set is to be read out from the circuit 50, a read pulse is supplied to a signal line 70n. With this operation, the data indicating the time (e.g., 8:00), stored in the circuit 50, at which the mode for outputting received data from the memory is set is outputted to the signal line 50a.

A console unit 52 includes one-touch abbreviation dials, a start key, a "*" key, a "#" key, and the like, and data obtained upon depression of such a dial or key is outputted to a signal line 52a.

A communication number & sub-address registration circuit 54 serves to register a communication number corresponding to received data stored in the memory and its sub-address. When a communication number and a sub-address are to be registered in the circuit 54, data is outputted to a signal line 54a according to the following format: a communication number (e.g., 1222), a space, and a sub-address (e.g., 01). Thereafter, a write pulse is supplied to a signal line 70o. With this operation, the sub-address is registered in the circuit 54 in correspondence with the communication number. When no sub-address is specified, "" is registered at the position of a sub-address. When data registered in the circuit 54 is to be cleared, data indicating a communication number (e.g., 1111), a space, and a clear signal (##) are outputted in the order named, and a write pulse is supplied to the signal line 70o. With this operation, the contents of the specified communication number, registered in the circuit 54, are cleared. When data registered in the circuit 54 is to be read out, a read pulse is supplied to a signal line 50p after a communication number (e.g., 1222) is outputted to the signal line 54a. With this operation, the sub-address data (e.g., 01) registered in the circuit 54 in correspondence with the specified communication number (e.g., 1222) is outputted to the signal line 54**a.

A 1st-time registration key 56 is used to register the time at which the mode for storing received data in the memory is set. When the key 56 is depressed, a depression pulse is supplied to a signal line 56a.

A 2nd-time registration key 58 is used to register the time at which the mode for outputting received data from the memory is set. When the key 58 is depressed, a depression pulse is supplied to a signal line 58a.

A ten-key pad 60 is used to register the time at which the mode for storing received data in the memory is set or the time at which the mode for outputting received data from the memory is set, or is used to output a communication report designating a sub-address. Ten-key data obtained upon depression of a key in the ten-key pad 60 is outputted to a signal line 60a.

A set key 62 is used to register the time at which the mode for storing received data in the memory is set or the time at which the mode for outputting received data from the memory is set. When the set key 62 is depressed, a depression pulse is supplied to a signal line 62a.

A report key 64 is used to output a communication management report. When the report key 64 is depressed, a depression pulse is supplied to a signal line 64a.

A sub-address specified communication report output key 66 is used to output a communication management report designating a sub-address. When the key 66 is depressed, a depression pulse is supplied to a signal line 66a.

A display unit 68 receives data outputted to a signal line 70q and displays the data.

When a sub-address is specified by a sender, a control circuit 70 controls the position of a sorter, to which the sub-address is to be outputted, in accordance with the received data. In an initializing operation, when "1" is specified as a sub-address, received data is stored in the sorter 1. When "2" is specified as a sub-address, received data is stored in the sorter 2. When "3" is designed as a sub-address, received data is stored in the sorter 3. When one of "4" to "255" is designated as a sub-address or no sub-address is specified, received data is stored in the sorter 4. Thereafter, for example, the maximum sub-address of past 30 sub-address specified communications is obtained. When all the recorded data stored in the sorters 1 to 4 are removed, the maximum sub-address is divided by three to obtain the number of sub-addresses of each of the sorters 1 to 3. Subsequent communications are performed in accordance with this number, and sub-address specified received data is outputted to a corresponding sorter. Sub-addresses corresponding to the sorters 1 to 4 are respectively displayed on the circuits 40, 42, 44, and 46.

FIGS. 2 to 5 are flow charts showing a control sequence of the control circuit 70 in FIGS. 1A and 1B.

Figure 2:
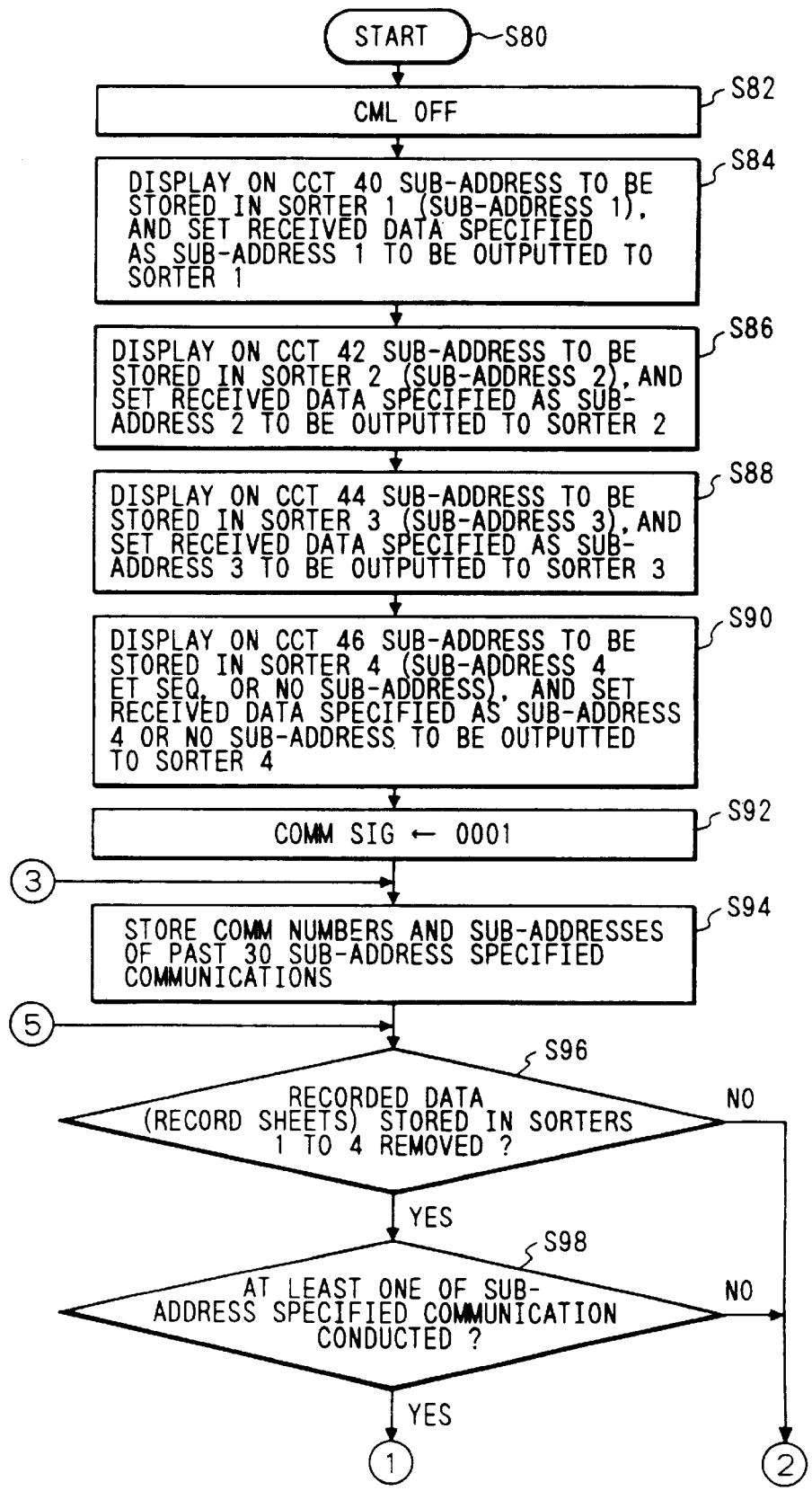
FIG. 2 is a flow chart showing a control sequence of a control circuit 70 in FIGS. 1A and 1B.

Referring to FIG. 2, step S80 indicates the start of the control sequence.

In step S82, a "0"-level signal is outputted to the signal line 70a to turn off CML.

In step S84, "sub-address 1" is displayed, as a sub-address to be stored in the sorter 1, on the circuit 40 via the signal line 70g, and received data specified as sub-address 1 is set to be outputted to the sorter 1 (30).

In step S86, "sub-address 2" is displayed, as a sub-address to be stored in the sorter 2, on the circuit 42 via the signal line 70h, and received data specified as sub-address 2 is set to be outputted to the sorter 2 (32).

In step S88, "sub-address 3" is displayed, as a sub-address to be stored in the sorter 3, on the circuit 44 via the signal line 70i, and received data specified as sub-address 3 is set to-be outputted to the sorter 3 (34).

In step S90, "sub-address 4 et seq." or "no sub-address" is displayed, as a sub-address to be stored in the sorter 4, on the circuit 46 via the signal line 70j, and received data specified as sub-address 4 et seq. or no sub-address is set to be outputted to the sorter 4 (36).

In step S92, "0001" is stored as a communication number.

In step S94, the communication numbers and sub-addresses of past 30 sub-address specified communications are stored.

Figure 4B:
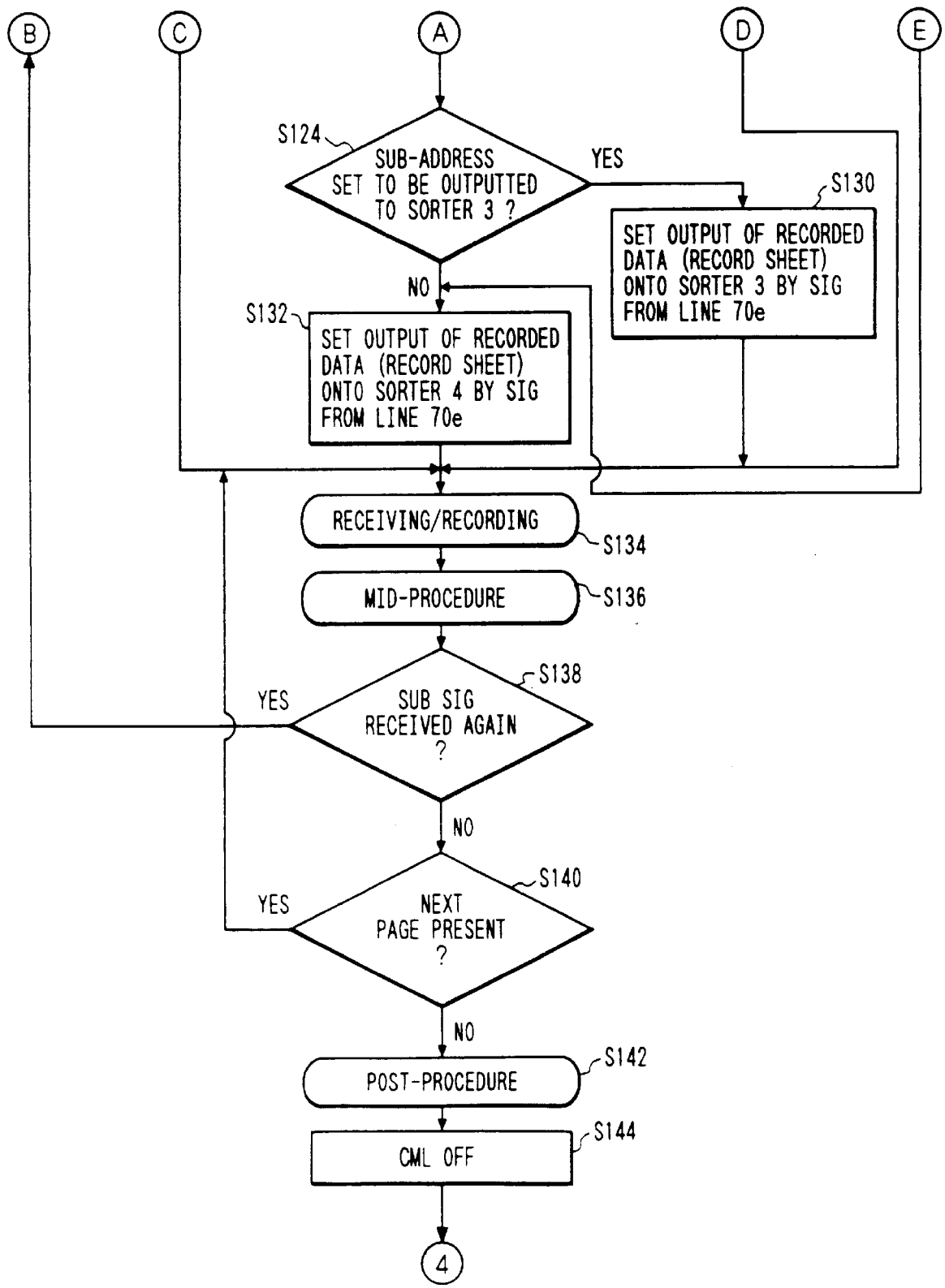
FIG. 4 is comprised of FIGS. 4A and 4B showing flow charts of the control sequence of the control circuit 70 in FIGS. 1A and 1B.

In step S96, it is checked whether all the recorded data (record sheets) in the sorters 1 to 4 are removed. If YES in step S96, the flow advances to step S98. If NO in step S96, the flow advances to step S110 (FIG. 4A).

In step S98, it is checked whether at least one sub-address specified communication is performed. If YES in step S98, the flow advances to step S100 (FIG. 3). If NO in step S98, the flow advances to step S110 (FIG. 4A).

In step S100, the maximum sub-address of the past 30 sub-address specified communications is divided by three, and the quotient is assumed as a sub-address a which decimal points are raised.

In step S102, "sub-addresses 1 to a" as sub-addresses to be stored in the sorter 1 is displayed on the circuit 40 via the signal line 70g, and received data specified as sub-addresses 1 to a is set to be outputted to the sorter 1 (30).

In step S104, "sub-addresses (a+1) to 2a " as sub-addresses to be stored in the sorter 2 is displayed on the circuit 42 via the signal line 70h, and received data specified as sub-addresses (a+1) to 2a is set to be outputted to the sorter 2 (32).

In step S106, "sub-addresses (2a+1) to 3a" as sub-addresses to be stored in the sorter 3 is displayed on the circuit 44 via the signal line 70i, and received data specified as sub-addresses (2a+1) to 3a is set to be outputted to the sorter 3 (34).

In step S108, "sub-address (3a+1) et seq." or "no sub-address" as a sub-address to be stored in the sorter 4 is displayed on the circuit 46 via the signal line 70j, and received data specified as sub-address (3a+1) et seq. or no sub-address is set to be outputted to the sorter 4 (36).

In step S110 (FIG. 4A), it is checked whether the receive mode is selected. If YES in step S110, the flow advances to step S114. If NO in step S110, the flow advances to step S112.

Step S112 indicates other processes. If the transmit mode is selected, the communication number is incremented by one.

In step S114, a "1"-level signal is outputted to the signal line 70a to turn on CML.

Step S116 indicates a pre-procedure. In this step, the 49th bit of FIF of a DIS signal is set to "1" to inform the sender that sub-address specified reception can be performed.

In step S118, it is checked whether a SUB signal is received. If YES in step S118, the flow advances to step S120. If NO in step S118, the flow advances to step S132.

In steps S120, S122, and S124, it is checked whether the sub-address is set to be outputted to the sorter 1, the sorter 2, the sorter 3., or the sorter 4. If the sub-address is set to be outputted to the sorter 1, the flow advances step S126 to set output of the recorded data onto the sorter 1 by a signal from the signal line 70e. If the sub-address is set to be outputted to the sorter 2, the flow advances to step S128 to set output of the recorded data onto the sorter 2 by a signal from the signal line 70e. If the sub-address is set to be outputted to the sorter 3, the flow advances to step S130 to set output of the recorded data onto the sorter 3 by a signal from the signal line 70e. If the sub-address is set to be outputted to the sorter 4, the flow advances to step S132 to set output of the recorded data onto the sorter 4 by a signal from the signal line 70e.

Step S134 indicates receiving/recording of one page.

Step S136 indicates a mid-procedure.

In step S138, it is checked whether a SUB signal is received. IF YES in step S138, the flow advances to step S118. If NO in step S138, the flow advances to step S140.

In step S140, it is checked whether the next page is present. If YES in step S140, the flow advances to step S134. If NO in step S140, the flow advances to step S142.

Step S142 indicates a post-procedure.

In step S144, a "0"-level signal is outputted to the signal line 70a to turn off CML.

In step S146 (FIG. 5), a sub-address number, the abbreviation name of a partner station, a communication start time, a communication time period, the number of sheets, a communication result, and the like are stored so as to correspond to a communication number.

In step S148, if the currently performed communication is a sub-address specified communication, the communication numbers and sub-addresses of the past 30 sub-address specified communications are stored.

In step S150, the communication number is incremented by one.

(Second Embodiment)

Considering a facsimile apparatus for memory-receiving data in the night and outputting the received data in the morning before the office opens, data may be outputted in the order of sub-addresses. In this case, consider output of recorded data onto one stage without using a sorter.

In a facsimile apparatus capable of performing sub-address specified communications, the following times are registered: the first-time after which all received data are stored in a memory; and the second-time at which output of received data stored in the memory is started and after which all received data are immediately recorded. In this case, memory-received data are stored together with sub-addresses, and the data stored in the memory are outputted in the order of the sub-addresses at the second-time.

Figure 6:
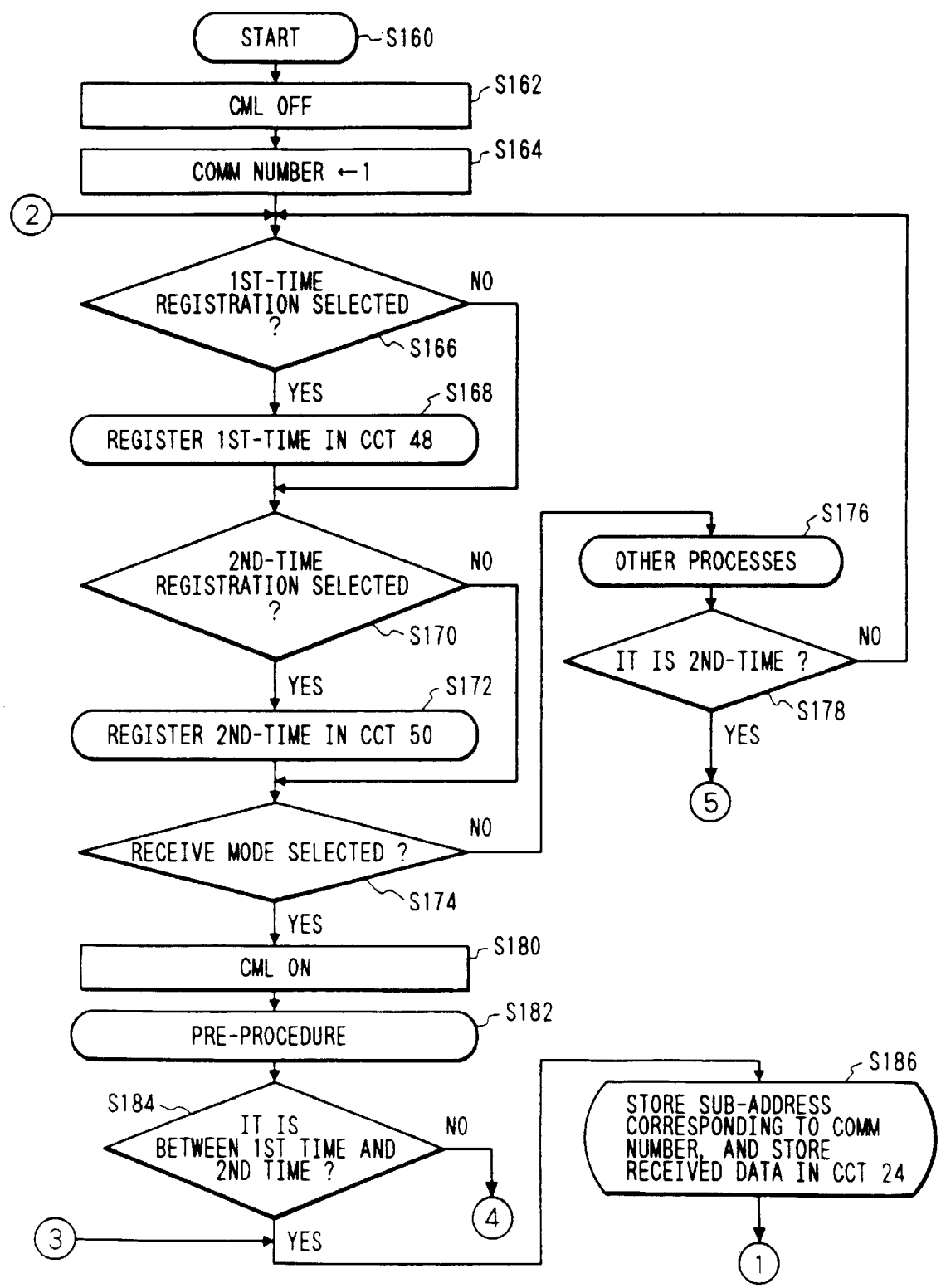
FIG. 6 is a flow chart showing another control sequence of the control circuit 70 in FIGS. 1A and 1B.
Figure 7:
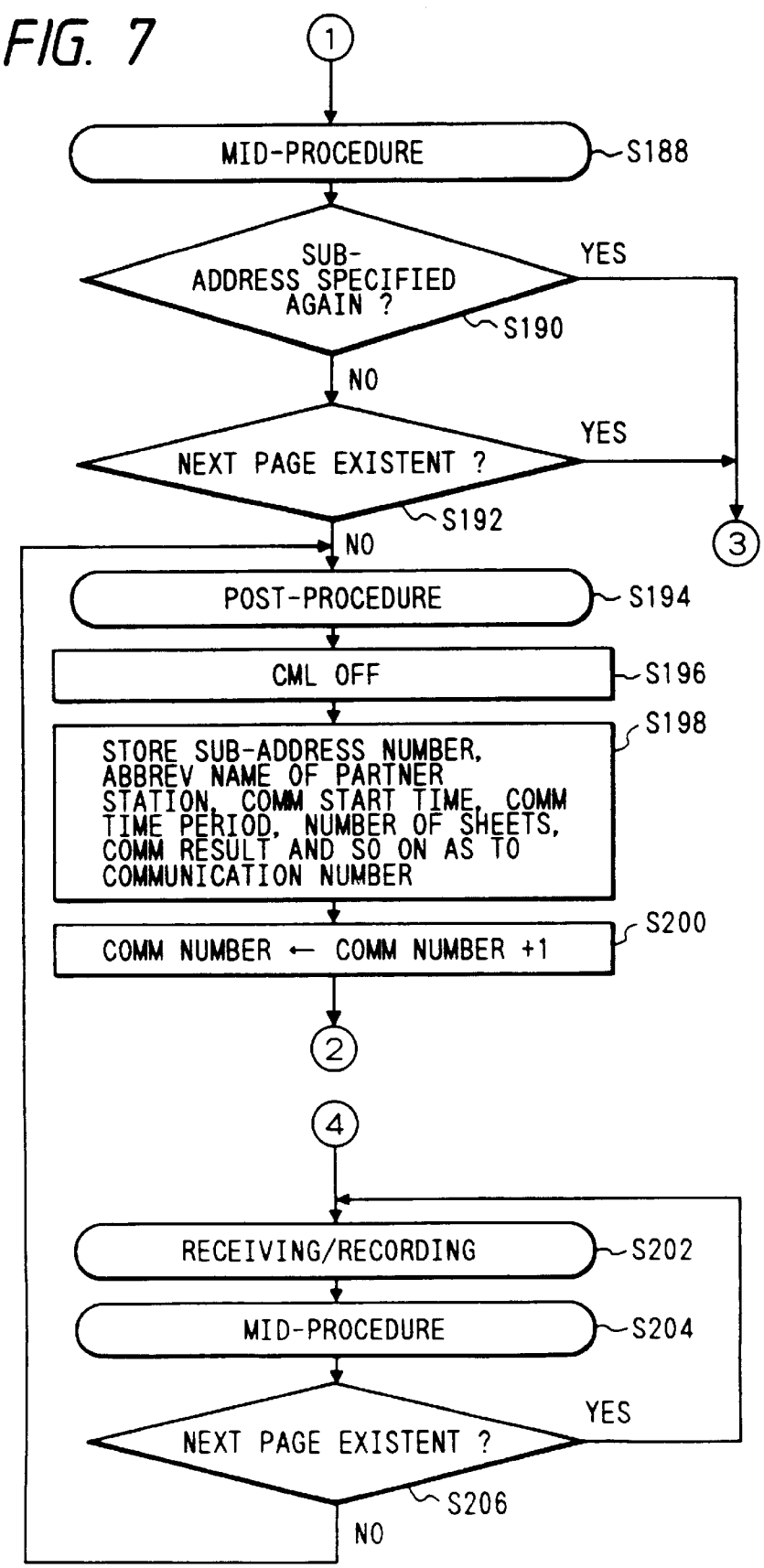
FIG. 7 is a flow chart showing the control sequence of the control circuit 70 in FIGS. 1A and 1B.
Figure 8:
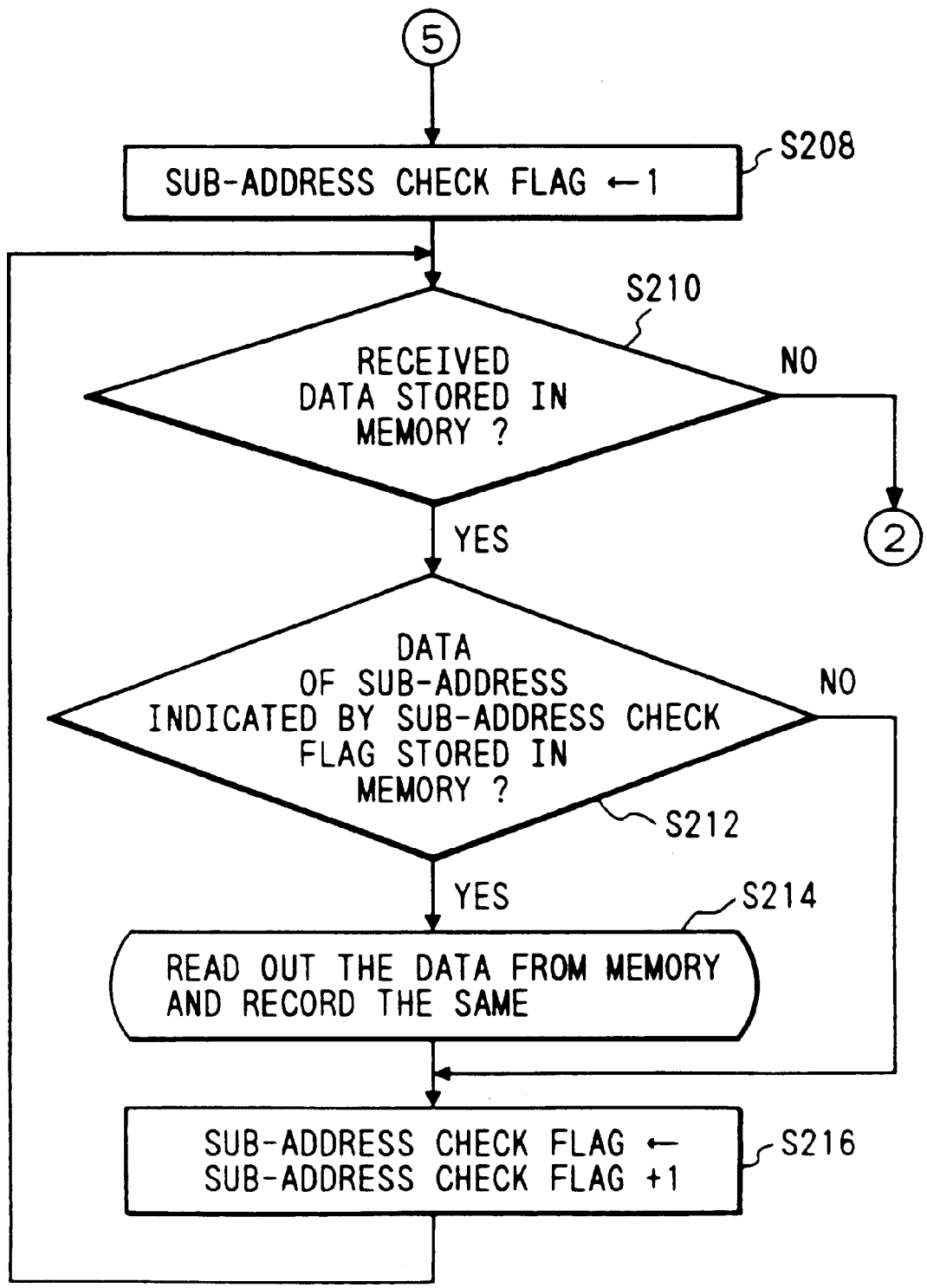
FIG. 8 is a flow chart showing the control sequence of the control circuit 70 in FIGS. 1A and 1B.

FIGS. 6 to 8 are flow charts showing a control sequence of a control circuit 70 for realizing the second embodiment.

Referring to FIG. 6, step S160 indicates the start of the control sequence.

In step S162, a "0"-level signal is outputted to a signal line 70a to turn off CML.

In step S164, "1" is set as a communication number.

In step S166, it is checked whether first-time registration is selected. If YES in step S166, the flow advances to step S168 to register the first-time in a memory-receive start time registration circuit (1st-time registration circuit) 48. If NO in step S166, the flow advances to step S170.

In step S170, second-time registration is selected (to set the second-time at which data stored in the memory are outputted and after which all received data are immediately recorded). If YES in step S170, the flow advances to step S172 to set the second-time in a read-out time registration circuit (2nd-time registration circuit) 50. If NO in step S170, the flow advances to step S174.

In step S174, it is checked whether the receive mode is selected. If YES in step S174, the flow advances to step S180. If NO in step S174, the flow advances to step S176.

Step S176 indicates other processes. In this step, if the transmit mode is selected, the communication number is incremented by one.

In step S178, it is checked whether it is the time at which the data stored in the memory are outputted, i.e., whether it is the second-time. If YES in step S178, the flow advances to step S208 (FIG. 8). If NO in step S178, the flow advances to step S166.

In step S180, a "1"-level signal is outputted to the signal line 70a to turn on CML.

Step S182 indicate a pre-procedure. In this step, the 49th bit of FIF of a DIS signal representing a sub-address specified reception function is set to "1".

In step S184, it is checked whether received data is to be stored in the memory, i.e., whether it is between the first-time registered in the circuit 48 and the second-time registered in the circuit 50. If YES in step S184, the flow advances to step S186. If NO in step S184, the flow advances to step S202 (FIG. 7).

In step S186, the received data is stored in a memory circuit 24 while a sub-address corresponding to the communication number is stored.

Step S188 (FIG. 7) indicates a mid-procedure.

In step S190, it is checked whether a sub-address is specified again. If YES in step S190, the flow advances to step S186 (FIG. 6). If NO in step S190, the flow advances to step S192.

In step S192, it is checked whether the next page is present. If YES in step S192, the flow advances to step S186 (FIG. 6). If NO in step S192, the flow advances to step S194.

Step S194 indicates a post-procedure.

In step S196, a "0"-level signal is outputted to the signal line 70a to turn off CML.

In step S198, a sub-address-number, the abbrev name of a partner station, a communication start time, a communication time period, the number of sheets, a communication result, and so on are stored so as to correspond to the communication number.

In step S200, the communication number is incremented by one.

Step S202 indicates a receiving/recording operation.

Step S204 indicates a mid-procedure.

In step S206, it is checked whether the next page is present. If YES in step S206, the flow advances to step S202. If NO in step S206, the flow advances to step S194.

In step S208 (FIG. 8), a sub-address check flag for outputting received data stored in the memory in the order of sub-addresses is set to "1".

In step S210, it is checked whether received data is stored in the memory circuit. If YES in step S210, the flow advances to step S212. If NO in step S210, the flow advances to step S166.

In step S212, it is checked whether the data of the sub-address indicated by the sub-address check flag is stored in the memory. If YES in step S212, the flow advances to step S214. If NO in step S212, the flow advances to step S216.

In step S214, the data of the sub-address indicated by the sub-address check flag is outputted from the memory circuit and recorded.

In step S216, the sub-address check flag is incremented by one.

(Third Embodiment)

When data having the same sub-address are outputted from the memory circuit in the second embodiment, the output data may be bound with a stapler.

In this control sequence, after a recording operation in step S214 in FIG. 8 is completed, a control operation is additionally performed to bind data having the same sub-address with a stapler circuit 38.

(Fourth Embodiment)

A sub-address may be specified by using a sub-address specified communication report output key 66 or a ten-key pad, and a communication management report may be outputted by specifying a sub-address upon depression of a report key 64.

(Fifth Embodiment)

Communication reports may be classified and outputted in units of sub-addresses.

(Sixth Embodiment)

In a combination of the first and second embodiments, when all recorded data are removed from the sorters, the maximum sub-address in a predetermined number of times of past sub-address specified reception is divided by the number of sorters used to obtain the number of sub-addresses per sorter. Subsequent communications are performed in accordance with the obtained number of sub-addresses, and sub-address specified received data is outputted to a corresponding sorter. Sub-addresses corresponding to the respective sorters are displayed on the display unit. In addition, the first-time, after which all received data are stored in the memory, and the second-time, at which output of received data stored in the memory is started and after which all received data are immediately recorded, are registered. Memory-received data are stored together with sub-addresses. At the second-time, received data stored in the memory are outputted to the respective sorters in accordance with the sub-addresses. In this case, the data are outputted onto each sorter in the order of the sub-addresses.

As described above, according to the present invention, in sub-address specified communications, the positions of sorters to which data are outputted can be changed in accordance with sub-addresses, and sub-address numbers assigned to one sorter can be changed on the basis of the total number of sub-addresses of received data. In addition, the mode for memory-receiving data in the night and outputting the data in the morning may be selected, so that the data stored in the memory are outputted in the order of sub-addresses. Furthermore, data can be bound with a stapler or the like in units of sub-addresses. Moreover, communication reports can be grouped and outputted in accordance with sub-addresses, or may be outputted upon specifying sub-addresses. Therefore, a user can easily use the facsimile apparatus.

(Seventh Embodiment)

An embodiment of the present invention will be described in detail below with reference to the accompanying drawings.

FIGS. 9A and 9B are block diagrams showing an embodiment of a facsimile apparatus to which the present invention is applied.

Referring to FIGS. 9A and 9B, an NCU (Network Control Unit) 102 connects a telephone network to terminals connected to the lines of the NCU 102 to use the telephone network for data communication and the like. That is, the NCU 102 performs connection control with respect to a telephone switched network, switches to a data communication path, and holds a loop. A signal line 102a is a telephone line. The NCU 102 receives a signal on a signal line 134a, and connects the telephone line to the telephone set side (i.e., connects the signal line 102a to a signal line 102b), when the signal level is "0". When the signal level is "1", the NCU 102 connects the telephone line to the facsimile apparatus side (i.e., connects the signal line 102a to a signal line 102c). In a normal state, the telephone line is connected to the telephone set side.

The apparatus includes a telephone set 104.

A hybrid circuit 106 serves to separate signals into signals for the transmission system and signals for the reception system. More specifically, a transmission signal on a signal line 116a is sent to the telephone line via the signal line 102c and the NCU 102. A signal sent from a partner station is outputted to a signal line 106a via the NCU 102 and the signal line 102c.

A reader 108 sequentially reads a one-line image signal from a transmission original in the main scanning direction, and forms a signal string constituted by binary values representing "white" and "black". The reader 108 is constituted by an image pickup device, e.g., a CCD (charge-coupled device), and an optical system. The signal string as binary values representing "white" and "black" is outputted to a signal line 108a.

An encoder 110 receives the binary data outputted to the signal line 108a, and outputs coded (MH (modified Huffman) coding or MR (modified Read) coding) data to a signal line 110a.

A modulator 112 performs modulation on the basis of the known CCITT recommendation v27ter (differential phase modulation) or CCITT recommendation v29 (quadrature modulation). The modulator 112 receives the signal on the signal line 110a, modulates it, and outputs the modulated data to a signal line 112a.

A modulator 114 performs modulation on the basis of the known CCITT recommendation v21. The modulator 114 receives a procedure signal on a signal line 134b, modulates it, and outputs the modulated data to a signal line 114a.

An adder 116 receives the signals on the signal lines 112a and 114a, and outputs the sum to a signal line 116a.

A demodulator 118 performs demodulation on the basis of the known CCITT recommendation v27ter (differential phase modulation) or CCITT recommendation v29 (quadrature modulation). The demodulator 118 receives the signal on the signal line 106a, demodulates it, and outputs the demodulated data to a signal line 118a.

A decoder/encoder 119 receives the demodulated data outputted to the signal line 118a, decodes the data again, and outputs the decoded data to a signal line 119a. A control circuit 134 determines a reception error state on the basis of the decoded data. The decoder/encoder 119 performs MR (modified Read) coding with k=8 with respect to the properly received decoded data, and outputs the decoded data to a signal line 119b.

A memory circuit 120 stores the coded data outputted to the signal line 119b in accordance with control through a signal line 134d. In addition, the memory circuit 120 outputs the data stored therein to a signal line 120a in accordance with control through the signal line 134d.

A decoder 121 receives the signal outputted to the signal line 119a, and outputs the decoded signal (MR (modified Read) decoding) to a signal line 121a.

A recorder 122 receives the data outputted to the signal line 120a and sequentially records signals representing "white" and "black" in units of lines.

A demodulator 124 performs demodulation on the basis of the known CCITT recommendation v21. The demodulator 124 receives the signal on the signal line 106a, demodulates it on the basis of the CCITT recommendation v21, and outputs the demodulated data to a signal line 124a.

A sorter 126 serves to sort received recorded images in accordance with the number of received recorded sheets, in units of communications, in accordance with the telephone number of each sender or designation of addressees, or by a combination of these assortment modes. Assume that the sorter 126 has 10 bins. The sorter 126 receives a signal outputted to a signal line 134c, and stores a received recorded image in a specific bin of the sorter which is specified by a signal from the signal line 134c.

When one of alphabetic keys "A" to "Z" of a console unit 128 is depressed, a signal representing the corresponding letter is outputted to a signal line 128a. When one of numeric keys "0" to "9", a "*" key, or a "#" key is depressed, a signal representing the corresponding numeral or symbol is outputted to a signal line 128b. When a start key is depressed, a corresponding signal is outputted to a signal line 128c.

An assortment mode memory circuit 129 stores data indicating assortment modes with respect to the bins of the sorter 126. The modes include the following: a mode of assortment based on the number of received sheets, a mode of performing assortment for each communication, a mode of assortment based on each partner station at the sender end, and a mode of assortment based on each assigned addressee at the receiver end. The memory circuit 129 stores data indicating assortment based on the respective modes in correspondence with the bins of the sorter 126. When mode data is to be stored in the circuit 129, data is outputted to a signal line 129a according to the following format: the ordinal (from "01" to "10"; for example, "01") of a bin of the sorter 126, a space, and a mode ("0" for the mode of assortment based on the number of received sheets, "1" for the mode of performing assortment for each communication, "2" for the mode of assortment based on each partner station at the sender end, and "3" for the mode of assortment based on each assigned addressee at the receiver end; for example, "10"). After the data is outputted, a write pulse is supplied to a signal line 134e. When mode data is to be read out from the circuit 129, data indicating the ordinal (e.g., "01") of a bin of the sorter 126 is outputted first to the signal line 129a, and a read pulse is then supplied to a signal line 134f. With this operation, an assortment mode (e.g., "0") registered in correspondence with the specified ordinal of the bin of the sorter 126 is outputted to the signal line 129a.

When the mode of assortment based on the number of received sheets is registered in the circuit 129 as an assortment mode for each bin of the sorter 126, the number of sheets registered in correspondence with the ordinal of each bin becomes effective. In a bin assigned number-of-sheets memory circuit 130, the number of sheets is registered in correspondence with each bin of the sorter 126. When the number of received sheets to be stored in each bin of the sorter 126 is to be registered in the circuit 130, data is outputted to a signal line 130a according to the following format: the ordinal (from "01" to "10"; for example, "01") of the bin of the sorter 126, a space, and the number of received sheets (e.g., "1") to be stored in the bin. After this data is outputted, a write pulse is supplied to a signal line 134g. When data is to be read out from the circuit 130, data indicating the ordinal (e.g., "01") of the bin of the sorter 126 is outputted first to the signal line 130a, and a read pulse is then supplied to a signal line 134h. With this operation, the number of received sheets (e.g., "1") registered in correspondence with the specified ordinal of the bin of the sorter 126 is outputted to the signal line 130a.

When the mode of assortment based on each partner station at the sender end is registered in the circuit 129 as an assortment method for each bin of the sorter 126, the telephone number of each sender which is registered in correspondence with the ordinal of each bin of the sorter 126 becomes effective. A bin assigned sender telephone number memory circuit 131 stores the telephone number of each sender to store a recorded image in the nth (n is a positive integer) bin of the sorter 126. Assume that the telephone number of a sender, recorded images of which are stored in the first bin, is 03-123-1111, and the telephone numbers of senders, recorded images of which are stored in the mth bin, are 03-123-2222 and 03-123-3333. When these telephone numbers are to be stored in the bin assigned sender telephone number memory circuit 131, data indicating "1* 03-123-1111" is outputted first to a signal line 131a, and a write pulse is supplied to a signal line 134i. Similarly, data indicating "m* 03-123-2222* 03-123-3333" is outputted first to the signal line 131a, and a write pulse is then supplied to the signal line 134i. When a telephone number is to be read out from the bin assigned sender telephone number memory circuit 131, data indicating the ordinal (e.g., "1") of a bin of the sorter 126 is outputted first to the signal line 131a, and a read pulse is then supplied to a signal line 134j. With this operation, the telephone number (e.g., 03-123-1111) of a sender is outputted to the signal line 131a to store a recorded image in a given bin (e.g., the first bin).

When the mode of assortment based on each assigned addressee is registered in the circuit 129 as an assortment mode for each bin of the sorter 126, the addressee registered in correspondence with the ordinal of each bin of the sorter 126 becomes effective. In a bin assigned address registration circuit 132, addressee data whose record sheets are stored are registered in correspondence with the respective bins of the sorter 126. When addressee data is to be registered in the circuit 132 in correspondence with each bin of the sorter 126, data is outputted to a signal line 132a according to the following format: data indicating the ordinal (from "01" to "10"; for example, "04") of a bin of the sorter 126, a space, and data indicating the assigned addressee (from, e.g., "001" to "010"; for example, "001" in this case) whose record sheets are stored in the specified bin. After this data is outputted, a write pulse is supplied to a signal line 134k. When addressee data is to be read out from the circuit 132, data indicating the ordinal (e.g., "04") of a bin of the sorter 126 is outputted first to the signal line 134a, and a read pulse is then supplied to a signal line 134f. With this operation, the addressee data (e.g., "1001") registered in correspondence with the specified ordinal of the bin of the sorter 126 is outputted to the signal line 132a.

The control circuit 134 performs the following control.

First of all, the control circuit 134 registers an assortment mode in the circuit 129 in correspondence with the ordinal of each bin of the sorter 126. With regard to the ordinal of a bin of the sorter 126 for which the mode of assortment based on the number of received sheets is registered, the control circuit 134 registers the number of sheets in the circuit 130. With regard to the ordinal of a bin of the sorter 126 for which the mode of assortment based on the telephone number of each sender is registered, the control circuit 134 registers the telephone number of the corresponding sender in the circuit 131. With regard to the ordinal of a bin of the sorter 126 for which the mode of assortment based on each assigned addressee on the receiver end is registered, the control circuit 134 registers a number indicating the assigned addressee at the receiver end in the circuit 132. Assume that in this embodiment, assortment is performed on the basis of the number of received sheets. As to the first bin of the sorter 126, data indicating "1" is stored as the number of received sheets. As to the second to ninth bins of the sorter 126, data indicating the numbers of received sheets equivalent to the ordinals of the respective bins are stored. As to the tenth bin of the sorter 126, data indicating "10" or more is stored as the number of received sheets. With this operation, as to the data stored in the first bin, an operator only needs to check addressees for each page because all the received data are stored in units of pages. As to the data stored in the second bin, the operator only needs to check addressees for every two pages because all the received data are stored in units of two pages. This applies to the second to ninth bins. Therefore, the operator can easily check addressees. As to the tenth bin, received data are stored in the same manner as the conventional method. However, since 10 or more record sheets are not received often, there is little adverse effect.

Figure 10:
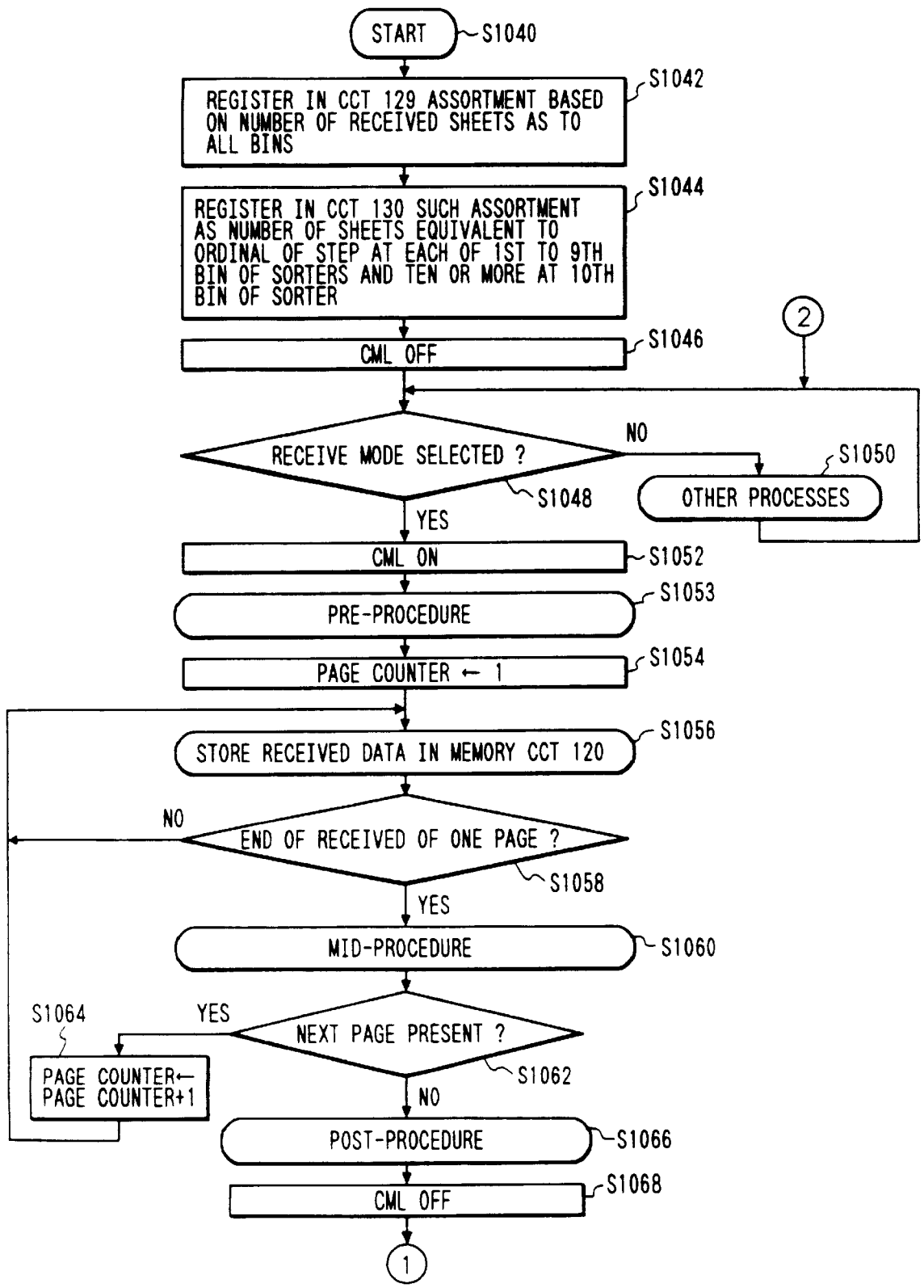
FIG. 10 is a flow chart showing still another control sequence of a control circuit 134 in FIG. 9B.
Figure 11:
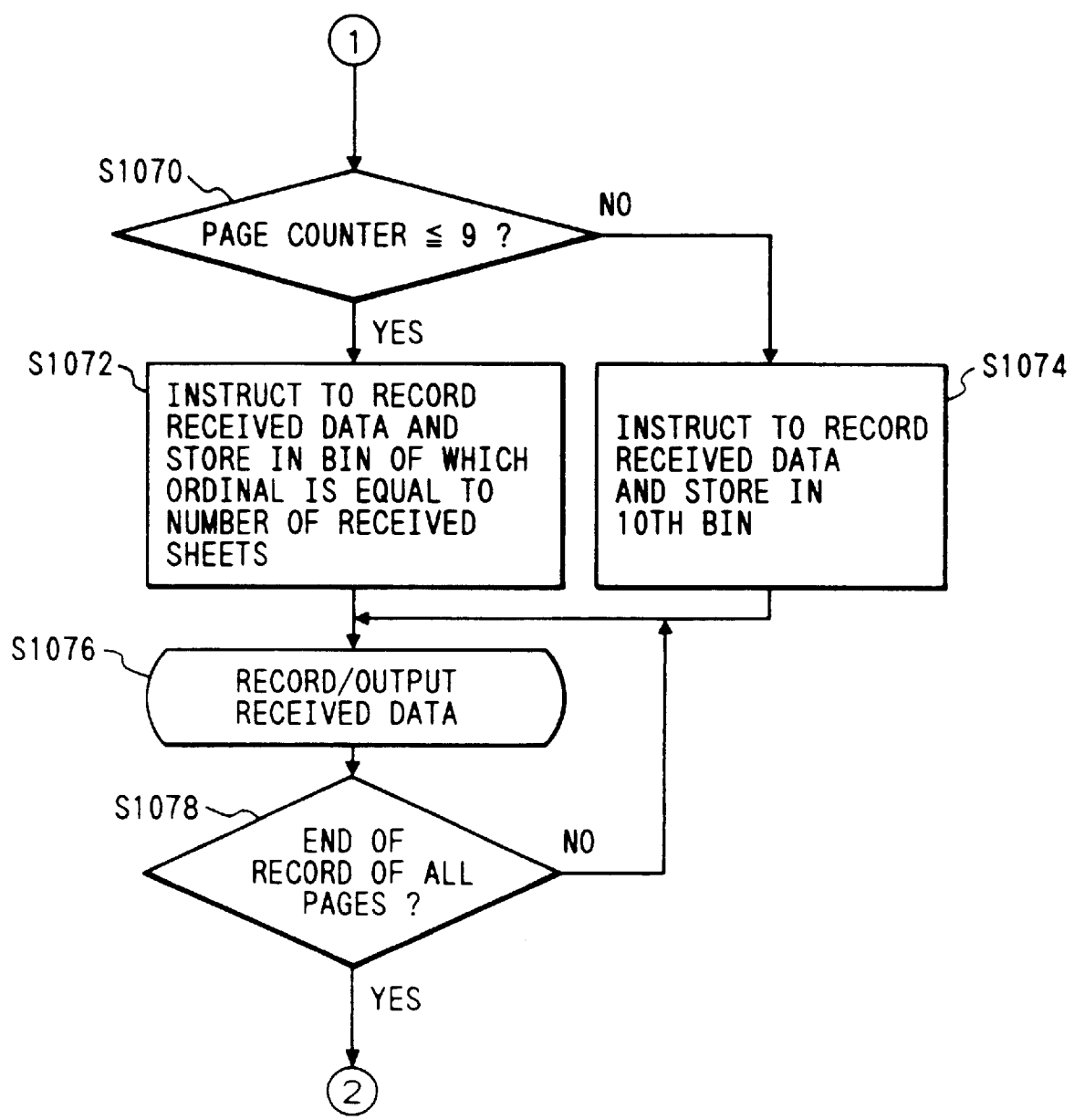
FIG. 11 is a flow chart showing the control sequence of the control circuit 134 in FIG. 10.

FIGS. 10 and 11 are flow charts showing a control sequence of the control circuit 134 in FIG. 9B.

Referring to FIG. 10, step S1040 indicates the start of the control sequence.

In step S1042, the mode of assortment based on the number of received sheets is registered in the assortment mode memory circuit 129 as to all the bins of the sorter 126.

In step S1044, the control circuit 134 stores, in the bin assigned number-of-sheets memory circuit 130, data indicating the numbers of received sheets equivalent to the ordinals of bins in correspondence with the first to ninth bins of the sorter 126, and data indicating "10" or more as the number of received sheets as to the tenth bin.

In step S1046, a "0"-level signal is outputted to the signal line 134a to turn off CML.

In step S1048, it is checked whether the receive mode is selected. If YES in step S1048, the flow advances to step S1052. If NO in step S1048, the flow advances to step S1050 to perform other processes.

In step S1052, a "1"-level signal is outputted to the signal line 134a to turn on CML.

Step S1053 indicates a pre-procedure.

In step S1054, "1" is set in a page counter for counting the number of received sheets.

In step S1056, received data is stored in the memory circuit 120 via the signal line 134d.

In step S1058, it is checked whether reception of one page is completed. If YES in step S1058, the flow advances step S1060. If NO in step S1058, the flow advances to step S1056.

Step S1060 indicates a mid-procedure.

In step S1062, it is checked whether the next page is present. If YES in step S1062, the flow advances to step S1064. If NO in step S1062, the flow advances to step S1066.

In step S1064, the page counter is incremented by one.

Step S1068 indicates a post-procedure.

In step S1068, a "0"-level signal is outputted to the signal line 134a to turn off CML.

In step S1070 (FIG. 11), it is checked whether the count value of the page counter is equal to or smaller than "9", i.e., whether the number of received sheets is equal to or smaller than "9". If YES in step S1070, the flow advances to step S1072. If NO in step S1070, the flow advances to step S1074.

In step S1072, the control circuit 134 instructs, via the signal line 134c, to record and store the received data in a bin whose ordinal is equal to the number of received sheets.

In step S1074, the control circuit 134 instructs, via the signal line 134c, to record and store the received data in the tenth bin.

In step S1076, the control circuit 134 records and outputs the received data to the specified bin via the signal line 134d.

In step S1078, it is checked whether recording of all pages is completed. If YES in step S1078, the flow advances to step S1048. If No in step S1078, the flow advances to step S1076.

(Eighth Embodiment)

A facsimile apparatus may include a means for identifying the number of received sheets. In this arrangement, received data may be outputted on the basis of the mode of assortment based on the number of received sheets, identified by this means, as to several specific bins of a sorter, while as to the remaining bins, received data may be outputted on the basis of the mode of performing assortment for each communication. For example, the mode of assortment based on the number of received sheets may be sorted as to the first to third bins, with "1" to "3" being respectively set as the numbers of received sheets, while received data of four or more sheets may be cyclically outputted to the fourth to tenth bins.

Figure 12:
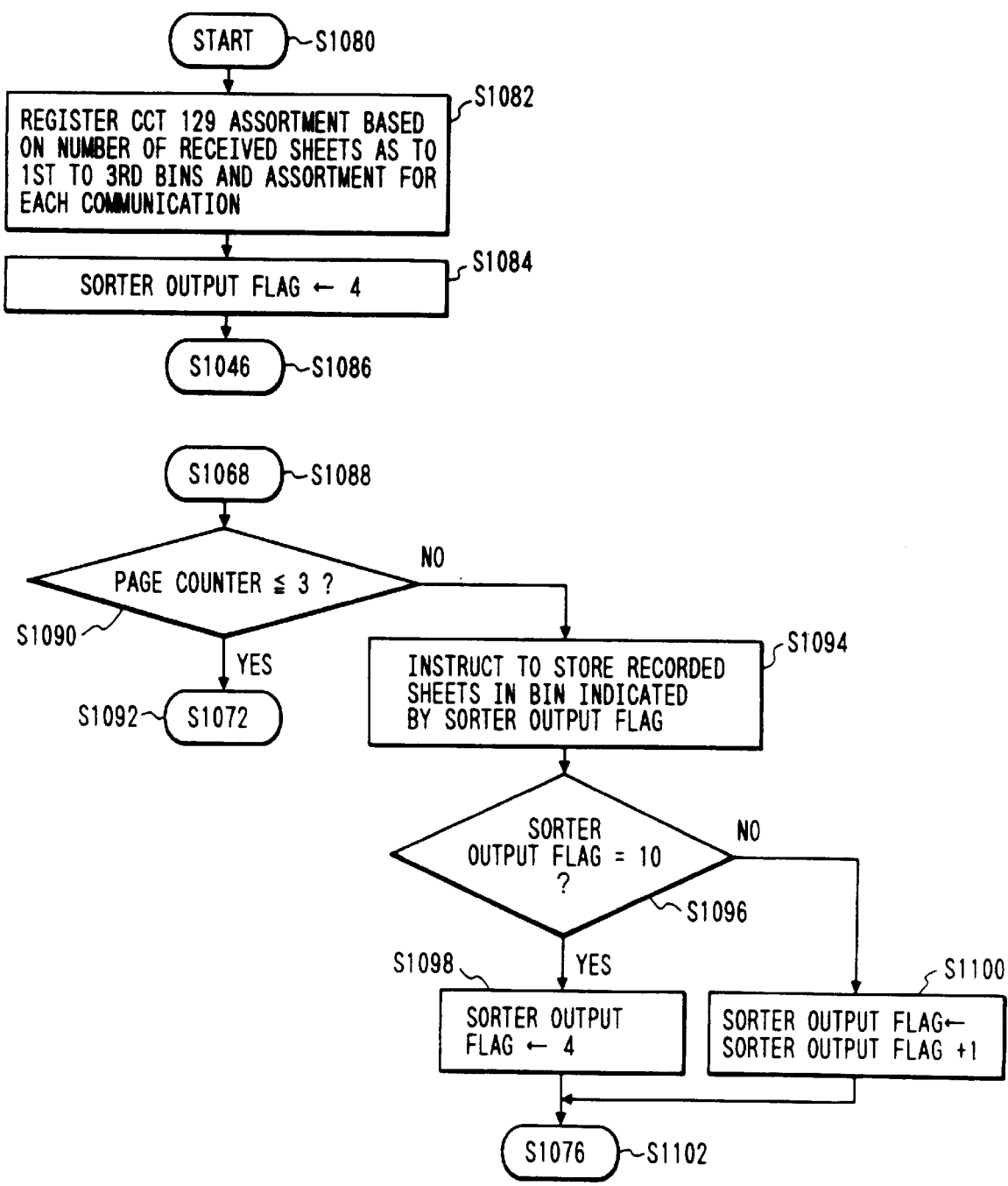
FIG. 12 is a flow chart showing still another control sequence of the control circuit 134 in FIG. 10.

FIG. 12 shows only portions, of a control sequence for the above operation, which are different from the corresponding portions in the control sequence shown in FIGS. 10 and 11.

Referring to FIG. 12, step S1080 indicates the start of the control sequence.

In step S1082, in an assortment mode memory circuit 129, the mode of assortment based on the number of received sheets is registered as the first to third bins of the sorter, and the mode of performing assortment for each communication is registered as to the fourth to tenth bins of the sorter.

In step S1084, "4" is stored in a sorter output as a flag for specifying a bin of the sorter to which a record sheet having a received image recorded thereon is to be outputted.

Steps S1086 and S1088 correspond to steps S1044 and S1068 in FIG. 10, respectively.

In step S1090, it is checked whether the count value of a page counter is equal to or smaller than "3". If YES in step S1090, the flow advances to step S1092. If NO in step S1090, the flow advances to step S1094.

Step S1092 corresponds to step S1072 in FIG. 11.

In step S1094, a control circuit 134 instructs, via a signal line 134c, to discharge the record sheet onto a bin specified by the sorter output flag.

In step S1096, it is checked whether the sorter output flag is "10". If YES in step S1096, the flow advances to step S1098. If "4" is stored in the sorter output flag, and the sorter output flag is not 10, the flow advances to step S1100 to increment the sorter output flag by one.

Step S1102 corresponds to step S1076 in FIG. 11.

(Ninth Embodiment)

A facsimile apparatus may include a means for identifying the number of received sheets. In this arrangement, received data may be outputted on the basis of the mode of assortment based on the number of received sheets, identified by this means, as to several specific bins of a sorter, while as to the remaining bins, received data may be outputted on the basis of the mode of assortment based on data of each sender. For example, the mode of assortment based on the number of received sheets may be sorted as to the first to third bins, with "1" to "3" being respectively set as the numbers of received sheets, while received data of four or more sheets may be sorted on the basis of the telephone numbers of the senders. Assume that received data from a sender of a telephone number A is stored in the fourth bin of the sorter, and received data from senders of telephone numbers B, C, D, E, and F are respectively stored in the fifth, sixth, seventh, eighth, and ninth bins of the sorter, while received data from senders of other telephone numbers or no specified telephone numbers are stored in the tenth bin of the sorter.

Figure 13:
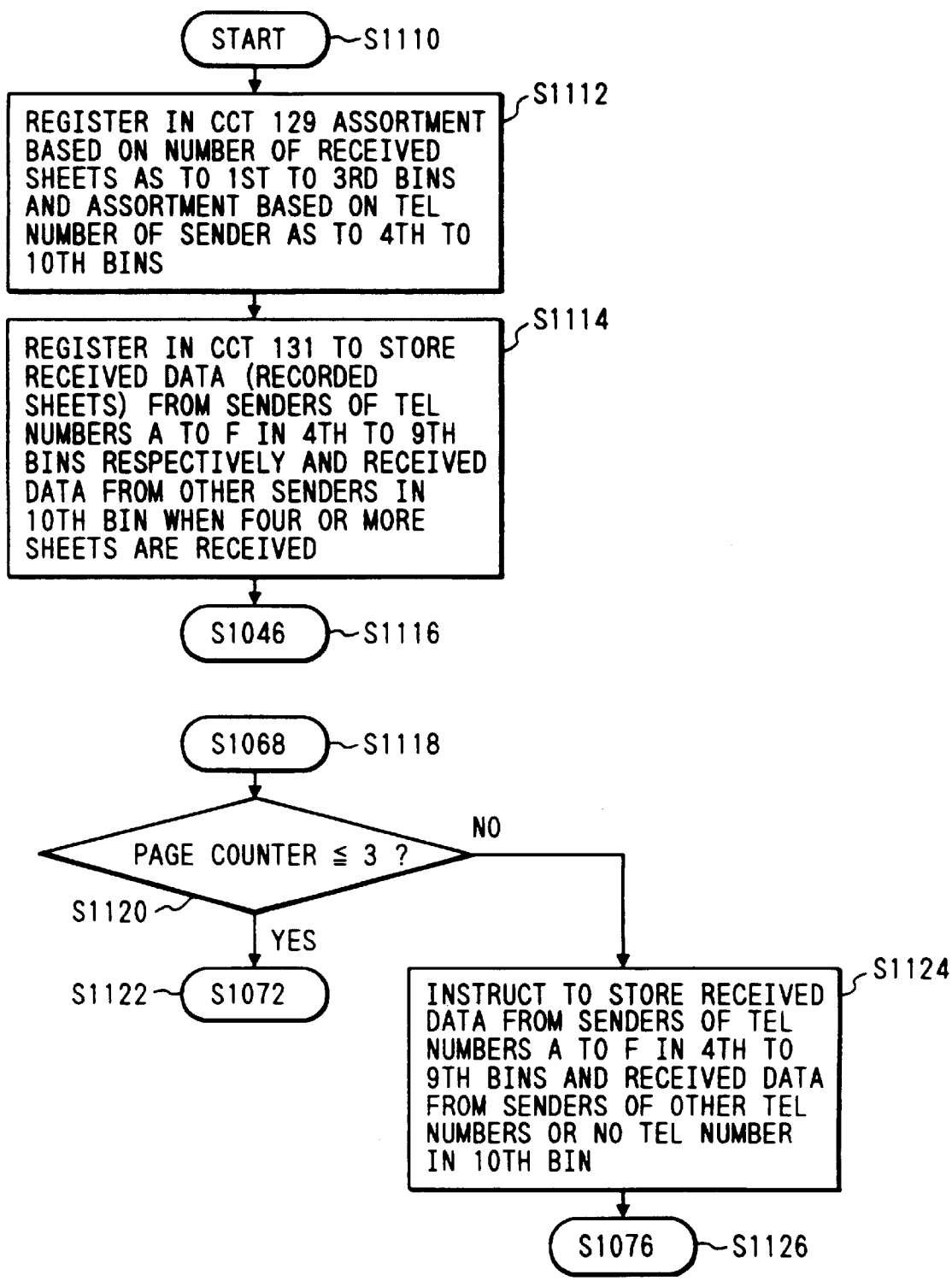
FIG. 13 is a flow chart showing still another control sequence of the control circuit 134 in FIG. 10.

FIG. 13 shows only portions, of a control sequence for the above operation, which are different from the corresponding portions in the control sequence shown in FIGS. 10 and 11.

Referring to FIG. 13, step S1110 indicates the start of the control sequence.

In step S1112, in an assortment mode memory circuit 129, the mode of assortment based on the number of received sheets is registered as the first to third bins of the sorter, and the mode of assortment based on the telephone numbers of senders is registered as to the fourth to tenth bins of the sorter.

In step S1114, telephone numbers are registered in a bin assigned sender telephone number memory circuit 131 such that when four or more recorded sheets are received, received data from the senders of the telephone numbers A to F are respectively stored in the fourth to ninth bins of the sorter, and received data from other senders are stored in the tenth bin.

Step S1116 corresponds to step S1146 in FIG. 11.

Although not shown, in this embodiment, the telephone numbers of the senders are stored in a step corresponding to the pre-procedure in step S1053 in FIG. 10.

Step S1118 corresponds to step S1068 in FIG. 10.

In step S1120, it is checked whether the count value of a page count is equal to or smaller than "3". If YES in step S1120, the flow advances to step S1122. If NO in step S1120, the flow advances to step S1124.

Step S1122 corresponds to step S1072 in FIG. 11.

In step S1124, a control circuit 134 instructs, via a signal line 134c, to store received data from the senders of the telephone numbers A to F in the fourth to ninth bins of the sorter, respectively, and received data from senders of other telephone numbers or no specified telephone numbers are stored in the tenth bin of the sorter.

Step S1126 corresponds to step S1076 in FIG. 11.

(Tenth Embodiment)

In the ninth embodiment, three or less received record sheets are stored in the first to third bins of the sorter. That is, a priority is given to the number of received sheets over the telephone numbers of senders. However, if three or less record sheets are received from senders of registered telephone numbers (the telephone numbers A to F in the ninth embodiment), the sheets may be outputted to the specified bins.

(Eleventh Embodiment)

A facsimile apparatus may include a means for identifying the number of received sheets. In this arrangement, received data may be outputted on the basis of the mode of assortment based on the number of received sheets, identified by this means, as to several specific bins of a sorter, while as to some of the remaining bins, received data may be outputted on the basis of the mode of assortment based on data of each addressee. For example, the mode of assortment based on the number of received sheets may be sorted as to the first to third bins, with "1" to "3" being respectively set as the numbers of received sheets, while received data of four or more sheets may be sorted on the basis of the data of each addressee at the receiver end. For example, received data of addressees indicated by "001" to "006" are respectively stored in the forth to ninth bins of the sorter, and received data of other addressees (addressees other than the addressees indicated by "001" to "006" or addressees with no specified data) are stored in the tenth bin.

Figure 14:
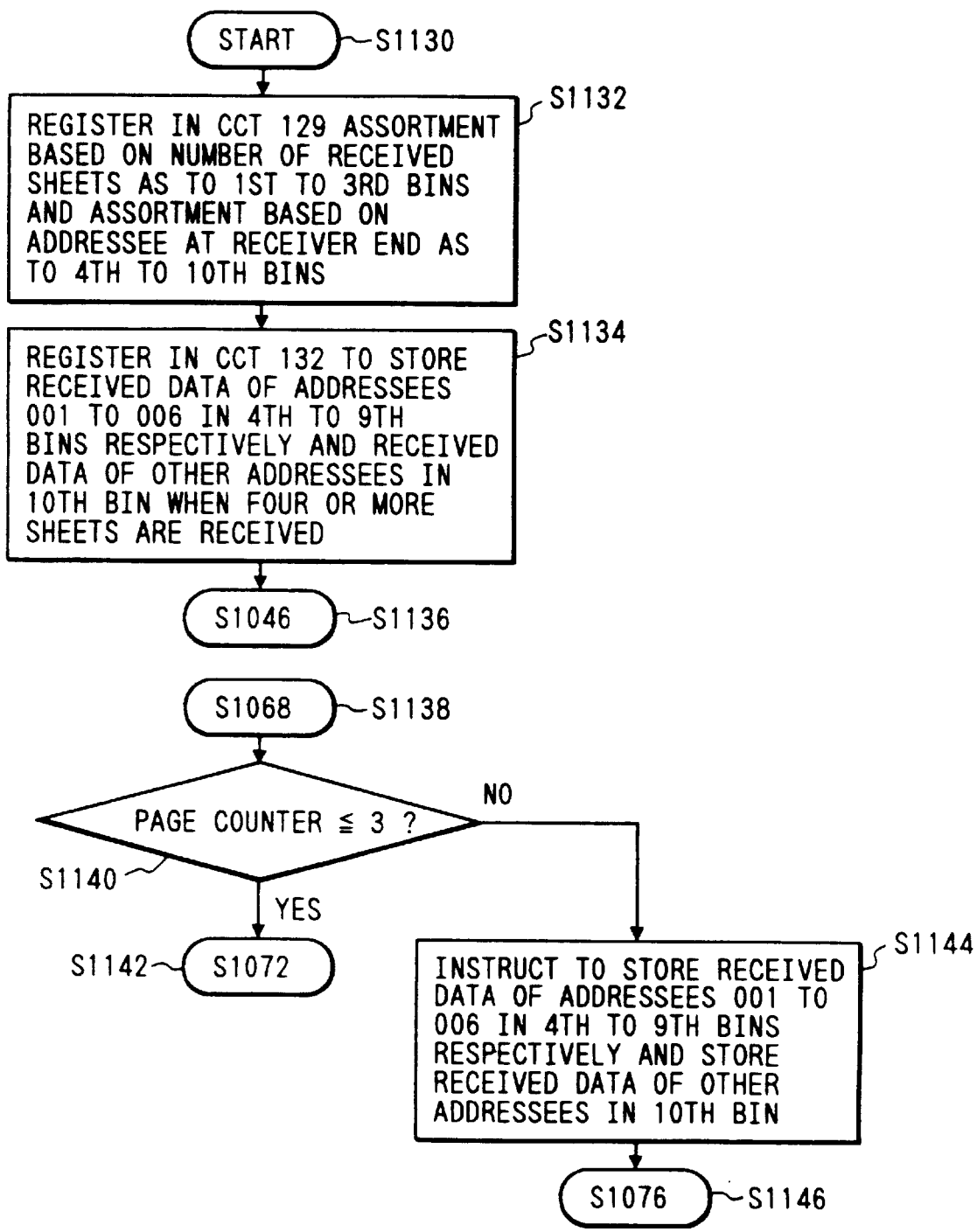
FIG. 14 is a flow chart showing still another control sequence of the control circuit 134 in FIG. 10.

FIG. 14 shows only portions, of a control sequence for the above operation, which are different from the corresponding portions in the control sequence shown in FIGS. 10 and 11.

Referring to FIG. 14, step S1130 indicates the start of the control sequence.

In step S1132, in a assortment mode memory circuit 129, the mode of assortment based on the number of received sheets is registered as the first to third bins of the sorter, and the mode of assortment based on addressees at the receiver end is registered as to the fourth to tenth bins of the sorter.

In step S1134, data of each addressee is registered in a bin assigned address registration circuit 132 such that when four or more sheets are received, received data of the addressees indicated by "001" to "006" are respectively stored in the fourth to ninth bins, and received data of other addressees or no specified data are stored in the tenth bin.

Step S1136 corresponds to step S1146 in FIG. 10.

Although not shown, in this embodiment, the data of addressees at the receiver end, which are informed by senders, are stored in a step corresponding to the pre-procedure in step S1053 in FIG. 10.

Step S1138 corresponds to step S1068 in FIG. 10.

In step S1140, it is checked whether the count value of a page counter is equal to or smaller than "3". If YES in step S1140, the flow advances to step S1142. If NO in step S1140, the flow advances to step S1144.

Step S1142 corresponds to step S1072 in FIG. 11.

In step S1144, a control circuit 134 instructs, via a signal line 134c, to store received data of the addressees indicated by "001" to "006" in the fourth to ninth bins of the sorter, respectively, and received data of other addressees are stored in the tenth bin of the sorter.

(Twelfth Embodiment)

In the tenth embodiment, similar to the ninth embodiment, the first priority is given to the mode of assortment based on the number of received sheets when three or less sheets are received, and the second priority is given to the mode of assortment based on the data of each addressee at the receiver end. However, the first priority may be given to the latter mode.

(Thirteenth Embodiment)

In the above embodiments, all the assortment modes using the sorter or sorters are registered from the beginning. However, registration of these modes, i.e., registration in the assortment mode memory circuit 129, may be made to be open to a user to allow him/her to register the modes.

As has been described above, according to the present invention, when received data of different numbers of pages are to be distributed, an operator need not perform a cumbersome operation of checking the received data page by page. Since received data are stored in each bin of a sorter in accordance with the number of received sheets predetermined for each bin, the operator can recognize the end of each communication for every predetermined number of received sheets, thereby facilitating distribution of received data.

What is claimed is:

1. A data communication apparatus, comprising:

a receiver, arranged to receive data and an address signal;

a first detector, arranged to detect the address signal;

a second detector, arranged to detect the number of pages of data received by said receiver; and a printer for recording on a recording sheet the data received by said receiver, wherein said printer comprises a sorter having a plurality of bins, and a controller, arranged to cause said sorter to change the bin to which the recording sheet recorded by said printer is discharged, in accordance with the address signal detected by said first detector, said controller being adapted to discharge the recording sheet to a predetermined bin of said sorter in the case where the number of pages of received data is within a predetermined range.

2. An apparatus according to claim 1, further comprising a register, arranged to register the bin corresponding to an address, wherein said controller identifies the address of the address signal, and causes said sorter to discharge the recording sheet recorded by said printer in the bin of said sorter corresponding to the address registered in said register, being consistent with the address as identified, in accordance with the address signal detected by said first detector.

3. An apparatus according to claim 1, wherein the data is image data.

4. An apparatus according to claim 1, wherein said data communication apparatus is a facsimile apparatus.

5. An apparatus according to claim 1, wherein said controller causes said sorter to discharge the recording sheet recorded by said printer, in a predetermined bin of said sorter, in the case where the address signal is not received.

6. A method for a data communication apparatus, comprising the steps of:

receiving data and an address signal;

detecting the address signal;

detecting the number of pages of data received in the reception step; and recording with a printer on a recording sheet the data received in said reception step, wherein the printer comprises a sorter having a plurality of bins, and causing the sorter to change the bin to which the recording sheet recorded by the printer is discharged, in accordance with the address signal detected in said address detection step, wherein said causing step includes causing the sorter to discharge the recording sheet to a predetermined bin of the sorter in the case where the number of pages of received data is within a predetermined range.

7. A method according to claim 6, further comprising the steps of:

registering the bin corresponding to a sub-address;

identifying the sub-address of the sub-address signal; and causing the sorter to discharge the recording sheet recorded by the printer in the bin of the sorter corresponding to the sub-address registered in said registering step and identified in said identifying step.

8. A method according to claim 6, wherein the data is image data.

9. A method according to claim 6, wherein the data communication apparatus is a facsimile apparatus.

10. A method according to claim 6, wherein said causing step includes causing the sorter to discharge the recording sheet recorded by the printer to a predetermined bin of the sorter, in the case where the address signal is not received.

* * * * *

UNITED STATES PATENT AND TRADEMARK OFFICE
CERTIFICATE OF CORRECTION

PATENT NO. : 6,141,109
DATED : October 31, 2000
INVENTOR(S) : Takehiro Yoshida

It is certified that error appears in the above-identified patent and that said Letters Patent is hereby corrected as shown below:

Column 3,
Line 45, "basis" should read -- basis --; and
Line 62, "(control" should read -- control --.

Column 6,
Line 23, "to-be" should read -- to be --; and
Line 43, "which" should read -- in which --.

Column 7,
Line 15, "advances step" should read -- advances to step --; and
Line 30, "IF YES" should read -- If YES --.

Column 8,
Line 28, "indicate" should read -- indicates --; and
Line 51, "abbrev" should read -- abbreviated --.

Column 11,
Line 29, "to-a" should read -- to a --; and
Line 49, " "10")." Should read -- "0"). --

Column 12,
Line 58, "(e.g., "1001")" should read -- (e.g., "001") --.

Column 13,
Line 27, "10" should not be in boldface type; and
Line 56, "advances step" should read -- advances to step --.

Column 16,
Line 16, "a assortment" should read -- assortment --.

Signed and Sealed this

Thirtieth Day of October, 2001

Attest:

NICHOLAS P. GODICI
*Attesting Officer*   *Acting Director of the United States Patent and Trademark Office*